United States Patent
Sirotkin et al.

(10) Patent No.: US 10,306,550 B2
(45) Date of Patent: May 28, 2019

(54) APPARATUS, SYSTEM AND METHOD OF WIRELESS LOCAL AREA NETWORK (WLAN) SETTING OF A USER EQUIPMENT (UE)

(71) Applicant: INTEL IP CORPORATION, Santa Clara, CA (US)

(72) Inventors: Alexander Sirotkin, Giv'on Hachadasha (IL); Sudeep Divakaran, Bangalore (IN); Anand Muralidharan, Bangalore (IN)

(73) Assignee: INTEL IP CORPORATION, Santa Clara, CA (US)

( * ) Notice: Subject to any disclaimer, the term of this patent is extended or adjusted under 35 U.S.C. 154(b) by 29 days.

(21) Appl. No.: 15/506,013

(22) PCT Filed: Sep. 25, 2015

(86) PCT No.: PCT/US2015/052080
§ 371 (c)(1),
(2) Date: Feb. 23, 2017

(87) PCT Pub. No.: WO2016/049386
PCT Pub. Date: Mar. 31, 2016

(65) Prior Publication Data
US 2017/0245208 A1    Aug. 24, 2017

Related U.S. Application Data

(60) Provisional application No. 62/055,594, filed on Sep. 25, 2014.

(51) Int. Cl.
*H04W 48/18* (2009.01)
*H04W 48/14* (2009.01)
(Continued)

(52) U.S. Cl.
CPC ........... *H04W 48/18* (2013.01); *H04W 48/14* (2013.01); *H04W 48/16* (2013.01);
(Continued)

(58) Field of Classification Search
CPC .................................................... H04W 48/18
See application file for complete search history.

(56) References Cited

U.S. PATENT DOCUMENTS

2008/0102815 A1    5/2008  Sengupta et al.
2010/0214958 A1*   8/2010  Wijayanathan ......... H04W 8/18
                                                         370/255
(Continued)

FOREIGN PATENT DOCUMENTS

EP          2362695         8/2011
KR        20120004747       1/2012
(Continued)

OTHER PUBLICATIONS

3GPP TS 36.300 V11.7.0 (Sep. 2013); Technical Specification; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)), 209 pages.
(Continued)

Primary Examiner — Ronald B Abelson
(74) Attorney, Agent, or Firm — Shichrur & Co.

(57) ABSTRACT

Some demonstrative embodiments include devices, systems and methods of Wireless Local Area Network (WLAN) setting of a User Equipment (UE). For example, a UE may include a Wireless Local Area Network (WLAN) transceiver to communicate with a WLAN; a cellular transceiver to communicate with a cellular network; a user interface to provide a user with a plurality of WLAN setting options and to receive an indication of a selected WLAN setting from the
(Continued)

plurality of WLAN setting options; and a connection manager to cause the WLAN transceiver to operate according to the selected WLAN setting.

24 Claims, 4 Drawing Sheets

(51) Int. Cl.
  *H04W 88/06* (2009.01)
  *H04W 84/04* (2009.01)
  *H04W 84/12* (2009.01)
  *H04W 48/16* (2009.01)

(52) U.S. Cl.
  CPC .......... *H04W 84/042* (2013.01); *H04W 84/12* (2013.01); *H04W 88/06* (2013.01)

(56) References Cited

U.S. PATENT DOCUMENTS

| | | | |
|---|---|---|---|
| 2011/0228699 A1* | 9/2011 | Shin | H04L 29/1232 370/254 |
| 2012/0079084 A1 | 3/2012 | Forssell et al. | |
| 2013/0109409 A1 | 5/2013 | Ortiz | |
| 2014/0004854 A1* | 1/2014 | Veran | H04W 48/18 455/432.1 |
| 2014/0204903 A1* | 7/2014 | Kim | H04W 48/18 370/331 |
| 2014/0211776 A1 | 7/2014 | Jang et al. | |

FOREIGN PATENT DOCUMENTS

| | | |
|---|---|---|
| KR | 20140085024 | 7/2014 |
| WO | 2014107195 | 7/2014 |
| WO | 2014119966 | 8/2014 |
| WO | 2014130094 | 8/2014 |

OTHER PUBLICATIONS

ETSI TS 136 331; V12.3.0 (Sep. 2014); LTE; Evolved Universal Terrestrial Radio 20 Access (E-UTRA); Radio Resource Control (RRC); Protocol specification (3GPP TS 36.331 version 12.3.0 Release 12), 383 pages.
International Preliminary Report on Patentability for PCT/US2015/052080, dated Apr. 6, 2017, 11 pages.
International Search Report and Written Opinion for PCT/US2015/052080, dated Mar. 18, 2016, 18 pages.
Alcatel Lucent, "Wi-Fi Roaming—Building on ANDSF and Hotspot2.0", Internet Citation, Feb. 27, 2012, 45 Pages.
European Search Report for European Patent Application No. 15844146.9, dated Mar. 13, 2018, 14 pages.

* cited by examiner

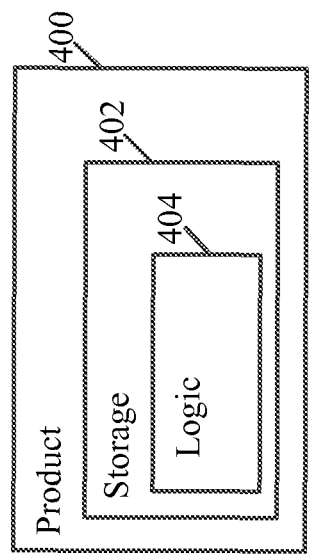

APPARATUS, SYSTEM AND METHOD OF WIRELESS LOCAL AREA NETWORK (WLAN) SETTING OF A USER EQUIPMENT (UE)

CROSS REFERENCE

This Application claims the benefit of and priority from U.S. Provisional Patent Application No. 62/055,594 entitled "USER PREFERENCES FOR OPERATOR AND NON-OPERATOR DEPLOYED WLAN", filed Sep. 25, 2014, the entire disclosure of which is incorporated herein by reference.

TECHNICAL FIELD

Some embodiments described herein generally relate to Wireless Local Area Network (WLAN) setting of a User Equipment (UE).

BACKGROUND

A wireless communication device, e.g., a mobile device, may be configured to utilize multiple wireless communication technologies.

For example, a User Equipment (UE) device may be configured to utilize a cellular connection, e.g., a Long Term Evolution (LTE) cellular connection, as well as a wireless-local-area-network (WLAN) connection, e.g., a Wireless-Fidelity (WiFi) connection.

There exists a need for solutions to enhance a level of cooperation and/or integration between WLAN and cellular networks.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 4 is a schematic illustration of a product, in accordance with some demonstrative embodiments.

DETAILED DESCRIPTION

Figure 1:
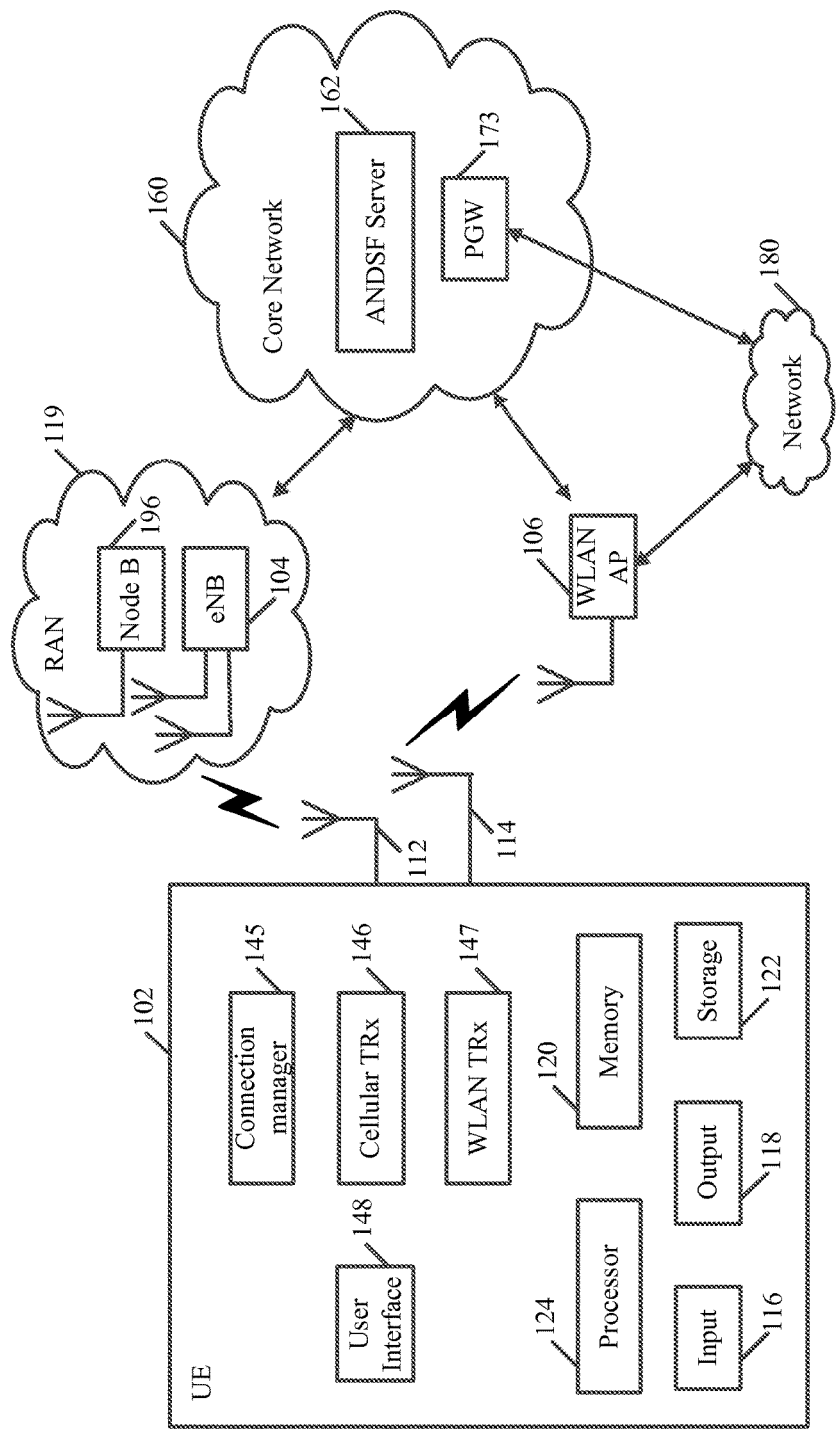
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment," "an embodiment," "demonstrative embodiment," "various embodiments," etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a Smartphone device, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wireless node, a base station (BS), a wired or wireless router, a wired or wireless modem, a video device, an audio device, an audio-video (A/V) device, a wired or wireless network, a wireless area network, a cellular network, a cellular node, a cellular device, a Wireless Local Area Network (WLAN), a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, vending machines, sell terminals, and the like.

Some embodiments may be used in conjunction with devices and/or networks operating in accordance with existing Long Term Evolution (LTE) specifications (including 3GPP TS 36.300 (3GPP TS 36.300 V11.7.0 (2013-09); *Technical Specification; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)*); and/or 3GPP TS 36.331 (*ETSI TS* 136 331; V12.3.0 (2014-

09); *LTE; Evolved Universal Terrestrial Radio Access (E-UTRA); Radio Resource Control (RRC); Protocol specification* (3GPP TS 36.331 version 12.3.0 Release 12))), and/or future versions and/or derivatives thereof, devices and/or networks operating in accordance with existing IEEE 802.16 standards (*IEEE-Std* 802.16, 2009 *Edition, Air Interface for Fixed Broadband Wireless Access Systems; IEEE-Std* 802.16e, 2005 *Edition, Physical and Medium Access Control Layers for Combined Fixed and Mobile Operation in Licensed Bands;* amendment to IEEE Std 802.16-2009, developed by Task Group m) and/or future versions and/or derivatives thereof, units and/or devices which are part of the above networks, and the like.

Some embodiments may be used in conjunction with one or more types of wireless communication signals and/or systems, for example, Radio Frequency (RF), Frequency-Division Multiplexing (FDM), Orthogonal FDM (OFDM), Single Carrier Frequency Division Multiple Access (SC-FDMA), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wireless Fidelity (Wi-Fi), Wi-Max, ZigBee™, Ultra-Wideband (UWB), Global System for Mobile communication (GSM), second generation (2G), 2.5G, 3G, 3.5G, 4G, 4.5G, Fifth Generation (5G) mobile networks, 3GPP, Long Term Evolution (LTE) cellular system, LTE advance cellular system, LTE Unlicensed systems, High-Speed Downlink Packet Access (HSDPA), High-Speed Uplink Packet Access (HSUPA), High-Speed Packet Access (HSPA), HSPA+, Single Carrier Radio Transmission Technology (1×RTT), Evolution-Data Optimized (EV-DO), Enhanced Data rates for GSM Evolution (EDGE), and the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit. The verb "communicating" may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a dipole antenna, a set of switched beam antennas, and/or the like.

The term "cell", as used herein, may include a combination of network resources, for example, downlink and optionally uplink resources. The resources may be controlled and/or allocated, for example, by a cellular node (also referred to as a "base station"), or the like. The linking between a carrier frequency of the downlink resources and a carrier frequency of the uplink resources may be indicated in system information transmitted on the downlink resources.

Some demonstrative embodiments are described herein with respect to a LTE network. However, other embodiments may be implemented in any other suitable cellular network or system, e.g., a Universal Mobile Telecommunications System (UMTS) cellular system, a GSM network, a 3G cellular network, a 4G cellular network, a 4.5G network, a 5G cellular network, a WiMAX cellular network, and the like.

Some demonstrative embodiments are described herein with respect to a WLAN system. However, other embodiments may be implemented in any other suitable non-cellular network.

Some demonstrative embodiments may be used in conjunction with a Heterogeneous Network (HetNet), which may utilize a deployment of a mix of technologies, frequencies, cell sizes and/or network architectures, e.g., including cellular, mmWave, and/or the like. In one example, the HetNet may include a radio access network having layers of different-sized cells ranging from large macrocells to small cells, for example, picocells and femtocells. Other embodiments may be used in conjunction with any other suitable wireless communication network.

Reference is now made to FIG. 1, which schematically illustrates a block diagram of a system 100, in accordance with some demonstrative embodiments.

As shown in FIG. 1, in some demonstrative embodiments, system 100 may include one or more wireless communication devices capable of communicating content, data, information and/or signals via one or more wireless mediums, for example, a radio channel, a cellular channel, an RF channel, a Wireless Fidelity (WiFi) channel, an IR channel, and the like, e.g., as described below. One or more elements of system 100 may optionally be capable of communicating over any suitable wired communication links.

In some demonstrative embodiments, system 100 may include at least one User Equipment (UE) 102 capable of communicating with one or more wired networks 180 via at least one Radio Access Network (RAN) 119, and/or via at least one non-cellular network, e.g., as described below.

In some demonstrative embodiments, UE 102 may include, for example, a mobile computer, a MD, a STA, a laptop computer, a notebook computer, a tablet computer, an Ultrabook™ computer, a mobile internet device, a handheld computer, a handheld device, a storage device, a PDA device, a handheld PDA device, an Internet of Things (IoT) device, a sensor device, a wearable device, an on-board device, an off-board device, a hybrid device (e.g., combining cellular phone functionalities with PDA device functionalities), a consumer device, a vehicular device, a non-vehicular device, a mobile or portable device, a mobile phone, a cellular telephone, a PCS device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a video device, an audio device, an A/V device, a gaming device, a media player, a Smartphone, or the like.

In some demonstrative embodiments, networks 180 may include one or more Packet Data Networks (PDNs). For example, networks 180 may include an Internet network, an IP Multimedia Core Network Subsystem (IMS) network, and/or any other PDN. In other embodiments, networks 180 may include any other suitable additional and/or alternative network.

In some demonstrative embodiments, RAN 119 may include one or more cells controlled by one or more cellular nodes ("nodes"). For example, RAN 119 may include an evolved Node B (eNB) 104, a Node B 196, and/or any other cellular node, e.g., a Base Station (BS), a Base Transceiver Station (BTS), and the like.

In some demonstrative embodiments, eNB 104 may be configured to perform radio resource management (RRM), radio bearer control, radio admission control (access control), connection mobility management, resource scheduling between UEs and eNB radios, e.g., Dynamic allocation of resources to UEs in both uplink and downlink, header compression, link encryption of user data streams, packet routing of user data towards a destination, e.g., another eNB or an Evolved Packet Core (EPC), scheduling and/or transmitting paging messages, e.g., incoming calls and/or connection requests, broadcast information coordination, measurement reporting, and/or any other operations.

In some demonstrative embodiments, system 100 may include a non-cellular network, for example, a WLAN, e.g., a Basic Service Set (BSS), managed by a WLAN Access Point (AP) 106.

In some demonstrative embodiments, system 100 may also include a Core Network (CN or CNW) 160, which may be configured to provide one or more services to UE 102, and/or to setup and/or manage communication between UE 102 and RAN 119 and/or networks 180, e.g., as described below.

In some demonstrative embodiments, CN 160 may include one or more PDN Gateways (PGWs) 173 to support a PDN connection between UE 102 and a PDN of network 180.

In some demonstrative embodiments, UE 102, eNB 104, WLAN AP 106, and/or Node B 196 may include one or more wireless communication units to perform wireless communication between UE 102, RAN 119, AP 106 and/or with one or more other wireless communication devices, e.g., as described below.

In some demonstrative embodiments, UE 102 may include a cellular Transceiver (TRx) 146 to communicate with RAN 119, and a WLAN TRx 147 to communicate with WLAN AP 106.

In some demonstrative embodiments, cellular TRx 146 and/or WLAN TRx 147 may include, or may be associated with, one or more antennas. In one example, UE 102 may include at least two antennas, e.g., antennas 112 and 114, or any other number of antennas, e.g., one antenna or more than two antennas.

In some demonstrative embodiments, antennas 112, and/or 114 may include any type of antennas suitable for transmitting and/or receiving wireless communication signals, blocks, frames, transmission streams, packets, messages and/or data. For example, antennas 112 and/or 114 may include any suitable configuration, structure and/or arrangement of one or more antenna elements, components, units, assemblies and/or arrays. For example, antennas 112 and/or 114 may include a phased array antenna, a dipole antenna, a single element antenna, a set of switched beam antennas, and/or the like.

In some embodiments, antennas 112 and/or 114 may implement transmit and receive functionalities using separate transmit and receive antenna elements. In some embodiments, antennas 112 and/or 114 may implement transmit and receive functionalities using common and/or integrated transmit/receive elements.

In some demonstrative embodiments, cellular TRx 146 and/or WLAN TRx 147 may include one or more wireless transmitters, receivers and/or transceivers including circuitry and/or logic able to send and/or receive wireless communication signals, RF signals, frames, blocks, transmission streams, packets, messages, data items, and/or data.

In some demonstrative embodiments, WLAN TRx 147 may be configured to communicate with AP 106 over a WLAN link, and cellular transceiver 146 may be configured to communicate with RAN 119 over a cellular link.

In some demonstrative embodiments, the WLAN link may include, for example, a Wireless Fidelity (WiFi) link, a Wireless Gigabit (WiGig) link, or any other link. In some demonstrative embodiments, the WLAN link may include, for example, a link over the 2.4 Gigahertz (GHz) or 5 GHz frequency band, the 60 GHz frequency band, and/or any other frequency band.

In some demonstrative embodiments, cellular TRx 146 may include a multiple input multiple output (MIMO) transmitters receivers system (not shown) including circuitry and/or logic, which may be capable of performing antenna beamforming methods, if desired. In other embodiments, cellular TRx 146 may include any other transmitters and/or receivers.

In some demonstrative embodiments, cellular TRx 146 may include a turbo decoder and/or a turbo encoder (not shown) including circuitry and/or logic for encoding and/or decoding data bits into data symbols, if desired. In other embodiments, cellular TRx 146 may include any other encoder and/or decoder.

In some demonstrative embodiments, cellular TRx 146 may include OFDM and/or SC-FDMA modulators and/or demodulators (not shown) including circuitry and/or logic configured to communicate OFDM signals over downlink channels, e.g., between RAN 119 and UE 102, and SC-FDMA signals over uplink channels, e.g., between UE 102 and RAN 119. In other embodiments, cellular TRx 146 may include any other modulators and/or demodulators.

In some demonstrative embodiments, WLAN TRx 147 may establish a WLAN link with AP 106. For example, WLAN TRx 147 may perform the functionality of one or more STAs, e.g., one or more WiFi STAs, WLAN STAs, and/or millimeter Wave (mmWave) STAs. The WLAN link may include an uplink and/or a downlink. The WLAN downlink may include, for example, a unidirectional link from AP 106 to the one or more STAs. The uplink may include, for example, a unidirectional link from a STA to AP 106.

In some demonstrative embodiments, UE 102 may be configured to utilize a cellular connection, e.g., a Long Term Evolution (LTE) cellular connection, a Universal Mobile Telecommunications System (UMTS) connection or any other cellular connection, to communicate with RAN 119, and a WLAN connection, e.g., a Wi-Fi connection or any other WLAN connection, to communicate with AP 106.

In some demonstrative embodiments, cellular TRx 146 may utilize the cellular link between UE 102 and RAN 119 to communicate traffic of one or more PDN connections, e.g., via one or more PGWs 173.

In some demonstrative embodiments, UE 102 may establish one or more bearers, e.g., one or more Evolved Packet-switched System (EPS) bearers, via the one or more PDN connections between UE 102 and one or more PGWs 173.

In some demonstrative embodiments, one or more elements of system 100 may perform the functionality of a HetNet, which may utilize a deployment of a mix of technologies, frequencies, cell sizes and/or network architectures, for example, including cellular, WLAN, and/or the like.

For example, the HetNet may be configured to provide a service through a first wireless communication environment, e.g., a cellular network, and to maintain the service when switching to another communication environment, e.g., WLAN. The HetNet architecture may enable utilizing a mixture of wireless communication environments, e.g., a WLAN environment and a cellular environment, for example, to optimally respond to rapid changes in customer demand, reduce power consumption, reduce cost, increase efficiency and/or achieve any other benefit.

In one example, system 100 may utilize a Multi-tier, Multi-Radio Access Technology (Multi-RAT) Het-Net architecture, including a tier of small cells, e.g., pico, femto, relay stations, WiFi APs, and the like, overlaid on top of a macro cellular deployment to augment network capacity.

In another example, system 100 may utilize Multi-RAT small cells integrating multiple radios such as WiFi and 3GPP air interfaces in a single infrastructure device.

In other embodiments, system 100 may implement any other architecture and/or deployment.

In some demonstrative embodiments, UE 102 may include a user interface 148 configured to provide a user of UE 102 with a plurality of WLAN setting options, and to receive an indication of a selected WLAN setting from the plurality of WLAN setting options, e.g., as described below.

In some demonstrative embodiments, the plurality of WLAN setting options may include setting options corresponding an operation state of WLAN TRX 147, a power state of WLAN TRX 147 and/or one or more operations, configurations and/or functionalities of WLAN TRX 147, e.g., as described below.

In some demonstrative embodiments, at least part of the functionality of user interface 148 may be implemented in the form of a Graphic User Interface (GUI). In other embodiments, user interface 148 may be implemented in the form of any other type of input and/or output interface, unit and/or element of UE 102.

In some demonstrative embodiments, at least part of the functionality of user interface 148 may be implemented by an application, for example, an Operating System (OS), or any other application, which may be executed by UE 102.

In some demonstrative embodiments, UE 102 may include a connection manager 145 configured to cause, instruct and/or trigger (collectively referred to as "cause") WLAN transceiver 147 to operate according to the selected WLAN setting, e.g., as described below.

In some demonstrative embodiments, connection manager 145 may control a power state of WLAN TRx 147, for example, based on the selected WLAN setting. For example, connection manager 145 may turn on or turn off WLAN TRx 147, e.g., as described below.

In some demonstrative embodiments, connection manager 145 may cause WLAN TRx 147 to perform one or more scanning operations, for example, based on the selected WLAN setting. For example, connection manager 145 may cause WLAN TRx 147 to scan for one or more WLAN networks, for example, by scanning for one or more WLAN identifiers of one or more WLAN networks, e.g., as described below.

In some demonstrative embodiments, connection manager 145 may include, or may be implemented using, suitable circuitry and/or logic, e.g., controller circuitry and/or logic, processor circuitry and/or logic, memory circuitry and/or logic, and/or any other circuitry and/or logic, which may be configured to perform at least part of the functionality of connection manager 145. Additionally or alternatively, one or more functionalities of connection manager 145 may be implemented by logic, which may be executed by a machine and/or one or more processors, e.g., as described below. In one example, connection manager 145 may include circuitry and/or logic to cause UE 102 to perform one or more operations, communications and/or functionalities, e.g., as described herein.

In some demonstrative embodiments, UE 102 may also include, for example, one or more of a processor 124, an input unit 116, an output unit 118, a memory unit 120, and/or a storage unit 122. UE 102 may optionally include other suitable hardware components and/or software components. In some demonstrative embodiments, some or all of the components of UE 102 may be enclosed in a common housing or packaging, and may be interconnected or operably associated using one or more wired or wireless links.

In some demonstrative embodiments, processor 124 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. For example, processor 124 may execute instructions, for example, of an Operating System (OS) of UE 102 and/or of one or more suitable applications.

In some demonstrative embodiments, input unit 116 may include, for example, a keyboard, a keypad, a mouse, a touch-screen, a touch-pad, a track-ball, a stylus, a microphone, or other suitable pointing device or input device. Output unit 118 may include, for example, a screen, a touch-screen, a flat panel display, a Liquid Crystal Display (LCD) display unit, a plasma display unit, one or more audio speakers or earphones, or other suitable output devices.

In some demonstrative embodiments, memory unit 120 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 122 may include, for example, a storage drive, a storage card, and/or other suitable removable or non-removable storage units. Memory unit 120 and/or storage unit 122, for example, may store data processed by UE 102.

Figure 2:
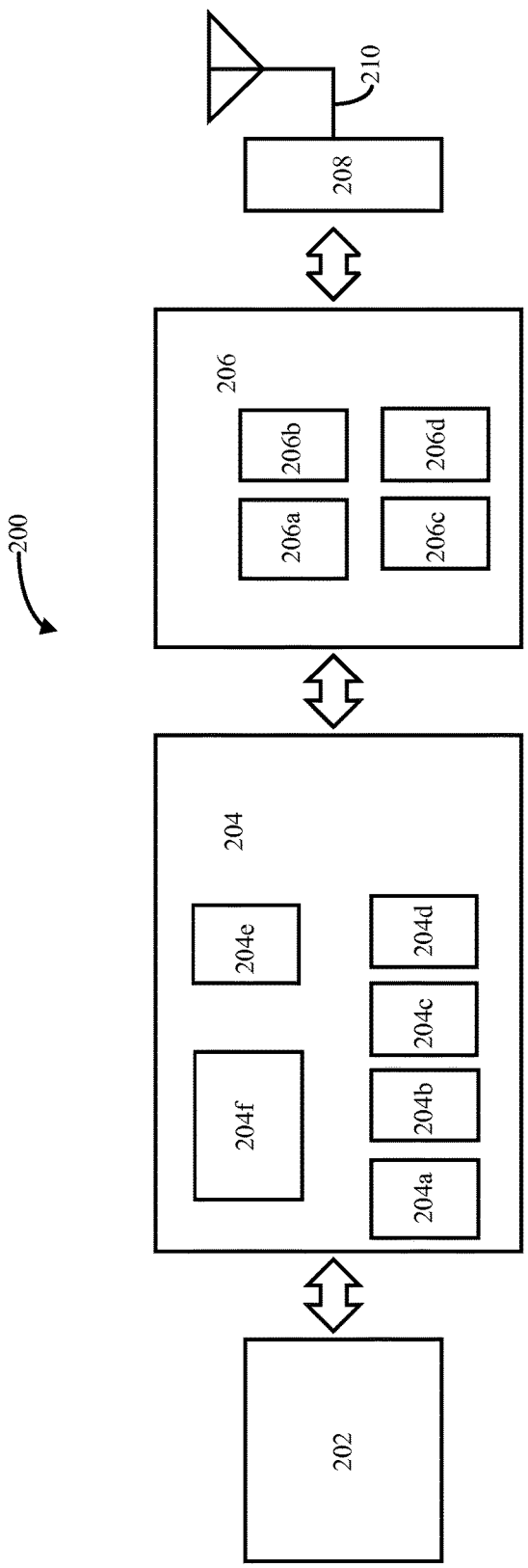
FIG. 2 is a schematic illustration of elements of a User Equipment (UE), in accordance with some demonstrative embodiments.

Reference is made to FIG. 2, which schematically illustrates elements of a UE device 200, in accordance with some demonstrative embodiments. For example, one or more elements of UE device 200 may perform the functionality of one or more elements of UE 102 (FIG. 1). In one example, one or more elements of UE device 200 may be configured to perform the functionality of one or more of cellular TRx 146 (FIG. 1), WLAN TRx 147 (FIG. 1), connection manager 145 (FIG. 1), user interface 148 (Fil. 1), and/or one or more other elements of UE 102 (FIG. 1). In some demonstrative embodiments, embodiments of a UE may be implemented into a system using any suitably configured hardware and/or software. FIG. 2 illustrates, for one embodiment, example components of UE device 200.

In some demonstrative embodiments, UE device 200 may include application circuitry 202, baseband circuitry 204, Radio Frequency (RF) circuitry 206, front-end module (FEM) circuitry 208, and one or more antennas 210, coupled together at least as shown.

In one example, application circuitry 202 may be configured to perform at least part of the functionality of user interface 148 (FIG. 1) and/or connection manager 145 (FIG. 1); and/or baseband circuitry 204, RF circuitry 206, and/or FEM circuitry 208 may be configured to perform at least part of the functionality of TRx 146 (FIG. 1), WLAN TRx 147 (FIG. 1), and/or connection manager 145 (FIG. 1).

In some demonstrative embodiments, the application circuitry 202 may include one or more application processors. For example, the application circuitry 202 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

In some demonstrative embodiments, the baseband circuitry 204 may include circuitry such as, but not limited to, one or more single-core or multi-core processors. The baseband circuitry 204 may include one or more baseband processors and/or control logic to process baseband signals received from a receive signal path of the RF circuitry 206 and to generate baseband signals for a transmit signal path of the RF circuitry 206. Baseband processing circuitry 204 may interface with the application circuitry 202, for example, for generation and processing of the baseband signals and for controlling operations of the RF circuitry 206. For example, in some embodiments, the baseband circuitry 204 may include a second generation (2G) baseband processor 204a, a third generation (3G) baseband processor 204b, a fourth generation (4G) baseband processor 204c, and/or other baseband processor(s) 204d for other existing generations, generations in development or to be developed in the future (e.g., fifth generation (5G), 6G, etc.). The baseband circuitry 204 (e.g., one or more of baseband processors 204a-d) may handle various radio control functions that enable communication with one or more radio networks via the RF circuitry 206. The radio control functions may include, but are not limited to, signal modulation/demodulation, encoding/decoding, radio frequency shifting, etc. In some embodiments, modulation/demodulation circuitry of the baseband circuitry 204 may include Fast-Fourier Transform (FFT), precoding, and/or constellation mapping/demapping functionality. In some embodiments, encoding/decoding circuitry of the baseband circuitry 204 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some demonstrative embodiments, the baseband circuitry 204 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 204e of the baseband circuitry 204 may be configured, for example, to run elements of the protocol stack for signaling of the PHY, MAC, RLC, PDCP and/or RRC layers. In some embodiments, the baseband circuitry may include one or more audio digital signal processor(s) (DSP) 204f. The audio DSP(s) 204f may be include elements for compression/decompression and echo cancellation, and/or may include other suitable processing elements in other embodiments. Components of the baseband circuitry 204 may be suitably combined in a single chip, a single chipset, or disposed on a same circuit board in some embodiments. In some embodiments, some or all of the constituent components of the baseband circuitry 204 and the application circuitry 202 may be implemented together such as, for example, on a system on a chip (SOC).

In some demonstrative embodiments, the baseband circuitry 204 may provide for communication compatible with one or more radio technologies. For example, in some embodiments, the baseband circuitry 204 may support communication with an evolved universal terrestrial radio access network (EUTRAN) and/or other wireless metropolitan area networks (WMAN), a wireless local area network (WLAN), a wireless personal area network (WPAN), and/or one or more additional or alternative networks. Embodiments in which the baseband circuitry 204 is configured to support radio communications of more than one wireless protocol may be referred to as multi-mode baseband circuitry.

In some demonstrative embodiments, RF circuitry 206 may enable communication with wireless networks using modulated electromagnetic radiation through a non-solid medium. In various embodiments, the RF circuitry 206 may include switches, filters, amplifiers, etc. to facilitate the communication with the wireless network. RF circuitry 206 may include a receive signal path which may include circuitry to down-convert RF signals received from the FEM circuitry 208, and to provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some demonstrative embodiments, the RF circuitry 206 may include a receive signal path and a transmit signal path. The receive signal path of the RF circuitry 206 may include mixer circuitry 206a, amplifier circuitry 206b, and filter circuitry 206c. The transmit signal path of the RF circuitry 206 may include filter circuitry 206c and mixer circuitry 206a. RF circuitry 206 may also include synthesizer circuitry 206d for synthesizing a frequency for use by the mixer circuitry 206a of the receive signal path and the transmit signal path. In some embodiments, the mixer circuitry 206a of the receive signal path may be configured to down-convert RF signals received from the FEM circuitry 208 based on the synthesized frequency provided by synthesizer circuitry 206d. The amplifier circuitry 206b may be configured to amplify the down-converted signals and the filter circuitry 206c may be, for example, a low-pass filter (LPF) or a band-pass filter (BPF), configured to remove unwanted signals from the down-converted signals to generate output baseband signals. Output baseband signals may be provided to the baseband circuitry 204 for further processing. In some embodiments, the output baseband signals may be zero-frequency baseband signals, although this is not a requirement. In some embodiments, mixer circuitry 206a of the receive signal path may comprise passive mixers, although the scope of the embodiments is not limited in this respect.

In some demonstrative embodiments, the mixer circuitry 206a of the transmit signal path may be configured to up-convert input baseband signals based on the synthesized frequency provided by the synthesizer circuitry 206d to generate RF output signals for the FEM circuitry 208. The baseband signals may be provided by the baseband circuitry 204 and may be filtered by filter circuitry 206c. The filter circuitry 206c may include a low-pass filter (LPF), although the scope of the embodiments is not limited in this respect.

In some demonstrative embodiments, the mixer circuitry 206a of the receive signal path and the mixer circuitry 206a of the transmit signal path may include two or more mixers and may be arranged for quadrature downconversion and/or upconversion respectively. In some embodiments, the mixer circuitry 206a of the receive signal path and the mixer circuitry 206a of the transmit signal path may include two or more mixers and may be arranged for image rejection (e.g., Hartley image rejection). In some embodiments, the mixer circuitry 206a of the receive signal path and the mixer circuitry 206a may be arranged for direct downconversion and/or direct upconversion, respectively. In some embodiments, the mixer circuitry 206a of the receive signal path and the mixer circuitry 206a of the transmit signal path may be configured for super-heterodyne operation.

In some demonstrative embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry, and the baseband circuitry 204 may include a digital baseband interface to communicate with the RF circuitry 206.

In some dual-mode embodiments, a separate radio IC circuitry may be provided for processing signals for each spectrum, although the scope of the embodiments is not limited in this respect.

In some demonstrative embodiments, the synthesizer circuitry 206d may be a fractional-N synthesizer or a fractional N/N+1 synthesizer, although the scope of the embodiments is not limited in this respect as other types of frequency synthesizers may be suitable. For example, synthesizer circuitry 206d may be a delta-sigma synthesizer, a frequency multiplier, or a synthesizer comprising a phase-locked loop with a frequency divider.

In some demonstrative embodiments, the synthesizer circuitry 206d may be configured to synthesize an output frequency for use by the mixer circuitry 206a of the RF circuitry 206 based on a frequency input and a divider control input. In some embodiments, the synthesizer circuitry 206d may be a fractional N/N+1 synthesizer.

In some demonstrative embodiments, frequency input may be provided by a voltage controlled oscillator (VCO), although that is not a requirement. Divider control input may be provided by either the baseband circuitry 204 or the applications processor 202 depending on the desired output frequency. In some embodiments, a divider control input (e.g., N) may be determined from a look-up table based on a channel indicated by the applications processor 202.

In some demonstrative embodiments, synthesizer circuitry 206d of the RF circuitry 206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some demonstrative embodiments, synthesizer circuitry 206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 206 may include an IQ/polar converter.

In some demonstrative embodiments, FEM circuitry 208 may include a receive signal path which may include circuitry configured to operate on RF signals received from one or more antennas 210, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210.

In some demonstrative embodiments, the FEM circuitry 208 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210.

In some embodiments, the UE device 200 may include one or more additional or alternative elements such as, for example, memory/storage, display, camera, sensor, and/or input/output (I/O) interface.

Referring back to FIG. 1, in some demonstrative embodiments UE 102 may be configured to enable an operator, e.g., a network operator of CN 160, to control, manage, and/or trigger one or more WLAN preferences, operations, communications, and/or functionalities of UE 102, for example, with respect to one or more WLAN networks ("also referred to as "operator-deployed WLAN networks"), which may be deployed by the operator and/or a partner of the operator, e.g., as described below.

In some demonstrative embodiments, in some scenarios and/or use cases, there may be some degree of conflict between a desire of the operator to control a setting of WLAN TRx 147, e.g., to control an on/off status of WLAN TRx 147, and between honoring user preferences of the user of UE 102 with respect to WLAN operation.

In some demonstrative embodiments, it may be advantageous to enable operators, e.g., an operator of CN 160, to have control over one or more WLAN preferences of UE 102, e.g., WLAN preferences set by a user of UE 102, for example, when the user of UE 102 is to use, or is within coverage of, an operator deployed WLAN network, e.g., as described below.

In one example, e.g., in one scenario, the user of UE 102 may select to turn-off a WLAN functionality of UE 102, for example, if the user of UE 102 has bad experience when connected to a non-operator deployed WLAN network, and/or for any other reason. The WLAN functionality of UE 102 may remain turned-off, for example, even when the UE 102 is within the coverage of a WLAN network deployed by the operator of CN 160, e.g., a "good" WLAN, which may provide a sufficient level of connectivity and/or a sufficient level of user experience. In such a scenario, the operator may not be able to offload user traffic to the WLAN, for example, if the WLAN functionality remains turned-off.

In another example, e.g., in another scenario, the user of UE 102 may select to turn-on a WLAN functionality of UE 102, and the WLAN functionality of UE 102 may remain turned-on, for example, even if there are no WLANs in the vicinity of UE 102. According to this example, if the WLAN functionality of UE 102 remains turned-on, WLAN TRx 147 may perform scanning operations to scan for WLAN networks, e.g., even when there are no networks that UE 102 may be able to use. However, if the operator is not able to instruct and/or trigger UE 102 to turn off the WLAN functionality, the operator may not be able to override the user preference to keep WLAN turned on, for example, even if the operator may be aware that no WLAN offload opportunities exist in this scenario and, accordingly, UE 102 may save power by turning off the WLAN functionality.

In some demonstrative embodiments, UE 102 may be configured to implement a WLAN user-preference configuration, which may be configured, for example, to differentiate between operator and non-operator deployed networks, and/or to allow operators, e.g., the operator of CN 160, to have more control over operator deployed WLAN networks, e.g., while keeping full user control over non-operator, e.g. home or work, deployed WLAN networks.

In some demonstrative embodiments, it may be disadvantageous to limit a UE to only a "global" WLAN-on setting, in which the WLAN is to operate in an "on" state with respect to all WLAN networks, e.g., without differentiating between operator-deployed WLAN networks and non-operator deployed WLAN networks; and/or a "global" WLAN-off setting, in which the WLAN is to operate in an "off" state with respect to all WLAN networks, e.g., without differentiating between operator-deployed WLAN networks and non-operator deployed WLAN networks. These WLAN-on and WLAN-off settings may be "global" WLAN settings, e.g., in the sense that the WLAN-on and WLAN-off settings may be configured to apply to all WLAN networks, e.g., without differentiating between operator-deployed and corporate/home WLAN networks. For example, at the WLAN-on setting, the UE may be able to scan for and connect to both operator deployed WLAN networks and corporate/home WLAN networks; and at the WLAN-off setting, the UE cannot use any WLAN networks.

In some demonstrative embodiments, user interface 148 may be configured to provide the user of UE 102 with a plurality of WLAN setting options, which may include one or more WLAN setting options in addition to, or instead of, a "global" WLAN-on setting and/or a "global" WLAN-off setting, e.g., as described below.

In some demonstrative embodiments, user interface 148 may be configured to provide the user of UE 102 with one or more WLAN setting options, which may be configured to enable separate configuration options for operator and non-operator deployed WLAN networks, e.g., as described below.

In some demonstrative embodiments, user interface 148 may be configured to provide the user of UE 102 with one or more additional or alternative WLAN setting options, which may be configured to enable the user of UE to allow the operator of CN 160 to control and/or trigger a setting of WLAN TRx 147, e.g., as described below.

In one example, user interface 148 may be configured to provide the user of UE 102 with a WLAN-no-user-preference setting option, e.g., a "don't care" WLAN setting option, or a "operator controlled" WLAN setting option, for example, in addition to, or instead of a WLAN-on setting option and/or a WLAN-off setting option, e.g., as described below. For example, at the WLAN-no-user-preference setting, connection manger 145 may cause and/or trigger WLAN TRx 147 to operate according to one or more criteria, for example, based on at least one operator setting to enable the operator of CN 160 to turn WLAN TRx 147 on or off, e.g., as described below.

In some demonstrative embodiments, user interface 148 may be configured to provide the user of UE 102 with a plurality of WLAN setting options including at least one operator-deployed WLAN setting relating to operator-deployed WLANs, and at least one user-defined WLAN setting relating to one or more user-defined WLANs, e.g., as described below.

In some demonstrative embodiments, the at least one operator-deployed WLAN setting may include at least an operator-deployed WLAN-on setting, and/or an operator-deployed WLAN-off setting.

In some demonstrative embodiments, the at least one user-defined WLAN setting may include at least a user-defined WLAN-on setting, and/or a user-defined WLAN-off setting.

In some demonstrative embodiments, user interface 148 may be configured to provide the user of UE 102 with the plurality of WLAN setting options including at least one global WLAN setting relating to both operator-deployed WLANs and user-defined WLANs.

In some demonstrative embodiments, the at least one global WLAN setting may include at least a global WLAN-on setting, and/or a global WLAN-off setting.

In some demonstrative embodiments, user interface 148 may be configured to provide the user of UE 102 with the plurality of WLAN setting options including at a WLAN-no-user-preference setting.

In some demonstrative embodiments, the WLAN-no-user-preference setting may enable the user of UE 102 to select not to have any preference with respect to the WLAN setting of WLAN TRx 147, for example, to allow connection manager 145 to control operation of WLAN TRx 147 according to one or more criteria, e.g., as described below.

In some demonstrative embodiments, connection manager 145 may be configured to cause WLAN TRx 147 to operate according to one or more criteria, when the selected WLAN setting, e.g., as selected by the user of UE 102, includes the WLAN-no-user-preference setting, e.g., as described below.

In some demonstrative embodiments, providing the option of selecting the WLAN-no-user-preference setting may be advantageous, for example, with respect to users, e.g., non-tech-savvy users, which may prefer not to manually set and/or control the WLAN settings and/or preferences to be used by UE 102. For example, the WLAN-no-user-preference setting may enable the user to allow connection manager 145 to control the WLAN settings and/or preferences, e.g., according to instructions from the operator and/or any other criteria, e.g., as described below.

In some demonstrative embodiments, the WLAN setting options may be configured to allow some users, e.g., tech-savvy users, to disable operator control for all or their user-defined WLAN networks, e.g., their home networks, office networks and/or any other user-defined networks; and/or to allow the operator to control WLAN TRx 147 with respect to one or more operator-deployed WLAN networks.

In some demonstrative embodiments, user interface 148 may be configured to provide the user of UE 102 with the plurality of WLAN setting options including one or more WLAN setting options of a global WLAN preference ("global WLAN setting options") to be applied to both operator-deployed WLAN networks, as well as non-operator deployed WLAN networks, e.g., including user-defined WLAN networks. For example, the global WLAN setting options may include a global WLAN-on setting, a global WLAN-off setting, and/or a global WLAN no-user-preference setting.

In some demonstrative embodiments, user interface 148 may be configured to provide the user of UE 102 with the plurality of WLAN setting options including one or more WLAN setting options ("operator-deployed WLAN setting options") of an operator-deployed WLAN preference to be applied to operator-deployed WLAN networks. For example, the operator-deployed WLAN setting options may include an operator-deployed WLAN-on setting, an operator-deployed WLAN-off setting, and/or an operator-deployed WLAN no-user-preference setting.

In some demonstrative embodiments, user interface 148 may be configured to provide the user of UE 102 with the plurality of WLAN setting options including one or more WLAN setting options of a non-operator-deployed WLAN preference ("non-operator-deployed WLAN setting options") to be applied to non-operator-deployed WLAN networks, e.g., including user-defined WLAN networks. For example, the non-operator-deployed WLAN setting options may include a non-operator-deployed WLAN-on setting, a non-operator-deployed WLAN-off setting, and/or a non-operator-deployed WLAN no-user-preference setting.

In some demonstrative embodiments, connection manager 145 may be configured to cause WLAN TRx 147 to operate according to one or more criteria including at least one operator setting from an operator of the cellular network, e.g., the operator of CN 160, for example, when a no-user-preference WLAN setting is selected, e.g., as described below.

In some demonstrative embodiments, for example, when the WLAN-no-user-preference setting is selected, connection manager 145 may be configured to turn WLAN TRx 147 on or off, for example, based on an operator setting in the form of a WLAN on/off indication, which may be received from the operator.

In some demonstrative embodiments, connection manager 145 may be configured to cause WLAN TRx 147 to operate according to at least one operator setting from an operator of the cellular network, e.g., the operator of CN 160, for example, when the operator-deployed WLAN-on setting is selected, e.g., as described below.

In some demonstrative embodiments, connection manager 145 may be configured to turn WLAN TRx 147 on or off, for example, based on the WLAN on/off indication, which may be received from the operator, for example, when the operator-deployed WLAN-on setting is selected.

In some demonstrative embodiments, the operator setting may be received by UE 102 via a message from RAN 119. For example, cellular transceiver 146 may receive from RAN 119 a message, e.g., a Radio Resource Control (RRC) message, including the operator setting. Connection manager 145 may be configured to process the operator setting received in the RRC message.

In some demonstrative embodiments, the operator setting may be received by UE 102 via a message from an Access Network and Selection Function (ANDSF) server 162. For example, UE 102 may receive from ANDSF server 162 a message, e.g., an ANDSF management Object (MO), including the operator setting. Connection manager 145 may be configured to process the operator setting received in the ANDSF MO.

In some demonstrative embodiments, user interface 148 may receive from the user of UE 102 an input to indicate that the user has selected a no-user-preference WLAN setting, for example, a global no-user-preference WLAN setting, or an operator-deployed no-user-preference WLAN setting.

In some demonstrative embodiments, in one example of a use-case, the user of UE 102 may have not configured any user-defined WLAN identifiers of one or more WLANs, e.g., if the user is a non-tech-savvy user, or for any other reason.

According to this example, the operator, e.g., the operator of CN 160, may provide to UE 102 one or more WLAN identifiers of one or more operator-deployed WLAN networks, for example, via RRC signaling and/or an ANDSF MO, e.g., as described above.

According to this example, connection manager 145 may use the WLAN identifiers of the one or more operator-deployed WLAN networks to ensure that WLAN TRx 147 is on, for example, when UE 102 is in good WLAN coverage, e.g., of an operator-deployed WLAN.

According to this example, connection manager 145 may turn WLAN TRX 147 off, for example, when UE 102 is out of WLAN coverage, thus reducing a power consumption of UE 102.

In some demonstrative embodiments, in an example of another use-case, the user of UE 102 may use user interface 148 to configure one or more user-defined WLAN identifiers of one or more WLANs, e.g., a home WLAN and/or an office WLAN.

According to this example, user interface 148 may receive from the user of UE 102 an input to indicate that the user has selected a non-operator-deployed WLAN setting, e.g., a non-operator-deployed WLAN-on setting or a non-operator-deployed WLAN-off setting.

According to this example, connection manager 145 may be configured to select not to enable the operator to turn WLAN TRX 147 on or off, e.g., to override the user preferences.

In some demonstrative embodiments, the operator-deployed WLAN settings and/or the no-user-preference WLAN setting may enable connection manager 145 to control WLAN TRX 147, for example, to control a WLAN on/off status, e.g., based on operator preference, for example, when the user of UE 102 has no desire to control, or does not care of, the WLAN settings.

In some demonstrative embodiments, connection manager 145 may be configured to apply different settings for operator and non-operator deployed WLAN networks, for example, based on whether an operator-deployed WLAN setting or a non-operator-deployed WLAN setting is selected by the user of UE 102.

In some demonstrative embodiments, connection manager 145 may be configured to control a scanning operation of WLAN TRx 147, for example, based on whether an operator-deployed WLAN setting or a non-operator-deployed WLAN setting is selected by the user of UE 102.

In some demonstrative embodiments, connection manager 145 may be configured to control WLAN TRx 147 to scan only for operator-deployed WLAN networks, for example, if the user of UE 102 configures one or more WLAN settings indicating that the user of UE 102 is not interested in using WLAN networks which are non-operator deployed, and/or that the user of UE 102 does not care which WLAN network will be used.

For example, connection manager 145 may be configured to control WLAN TRx 147 to scan only for operator-deployed WLAN networks, for example, if the user of UE 102 configures a global no-user-preference WLAN setting; if the user configures both the operator-deployed WLAN setting and the non-operator-deployed WLAN setting to no-user-preference; or if the user configures the operator-deployed WLAN setting to no-user-preference and the user has not manually configured any user-defined WLAN identifiers, e.g., if any WLAN identifiers maintained by UE 102 are only WLAN identifiers received from the operator of CN 160, e.g., via RRC signaling and/or an ANDSF MO.

In some demonstrative embodiments, connection manager 145 may be configured to allow the operator of CN 160 to control, e.g., to have partial or full control of WLAN TRx 147.

In some demonstrative embodiments, connection manager 145 may be configured to enable the operator to turn on WLAN TRx 147, for example, when WLAN offload is to be performed, and/or to turn off WLAN TRX 147, for example, when there are no operator deployed WLAN networks in the proximity of UE 102.

In some demonstrative embodiments, UE 102 may be configured to support enhanced RRC signaling and/or ANDSF messaging, e.g., using enhanced message formats or a new message format, which may be configured to provide one or more WLAN control indications to control WLAN TRX 147, e.g., as described below.

In some demonstrative embodiments, connection manager 145 may be configured to control WLAN TRx 147 based on a "WLAN on" indication to indicate that WLAN TRX 147 is to be turned on, and/or a "WLAN off" indication to indicate that WLAN TRX 147 is to be turned off.

In one example, UE 102 may be configured to process an RRCConnectionReconfiguration message, or any other message, including the WLAN control indication, for example, a "WLAN on" indication or a "WLAN off" indication.

In one example, the RRCConnectionReconfiguration message may include a command to modify an RRC connection. The RRCConnectionReconfiguration message may convey information for measurement configuration, mobility control, radio resource configuration (including RBs, MAC main configuration and physical channel configuration) including any associated dedicated NAS information and security configuration. For example, the RRCConnectionReconfiguration message may include, for example, one or more information elements, e.g., as follows:

Signaling radio bearer: SRB1
RLC-SAP: AM
Logical channel: DCCH
Direction: E-UTRAN to UE RRCConnectionReconfiguration Message

```
-- ASN1START
RRCConnectionReconfiguration ::=    SEQUENCE {
    rrc-TransactionIdentifier       RRC-TransactionIdentifier,
    criticalExtensions              CHOICE {
        c1                              CHOICE{
            rrcConnectionReconfiguration-r8     RRCConnectionReconfiguration-r8-IEs,
            spare7 NULL,
            spare6 NULL, spare5 NULL, spare4 NULL,
            spare3 NULL, spare2 NULL, spare1 NULL
        },
        criticalExtensionsFuture        SEQUENCE { }
    }
}
RRCConnectionReconfiguration-r8-IEs ::= SEQUENCE {
    measConfig                      MeasConfig                          OPTIONAL,    --
Need ON
    mobilityControlInfo             MobilityControlInfo                 OPTIONAL,    --
Cond HO
    dedicatedInfoNASList            SEQUENCE (SIZE(1..maxDRB)) OF
                                        DedicatedInfoNAS                OPTIONAL,    --
Cond nonHO
    radioResourceConfigDedicated    RadioResourceConfigDedicated        OPTIONAL, -- Cond
HO-toEUTRA
```

```
    securityConfigHO            SecurityConfigHO                        OPTIONAL,    --
Cond HO
    nonCriticalExtension        RRCConnectionReconfiguration-v890-IEs OPTIONAL
}
RRCConnectionReconfiguration-v890-IEs ::= SEQUENCE {
    lateNonCriticalExtension    OCTET STRING                            OPTIONAL,
    nonCriticalExtension        RRCConnectionReconfiguration-v920-IEs OPTIONAL
}
RRCConnectionReconfiguration-v920-IEs ::= SEQUENCE {
    otherConfig-r9              OtherConfig-r9                          OPTIONAL,    --
Need ON
    fullConfig-r9               ENUMERATED {true}                       OPTIONAL,    --
Cond HO-Reestab
    nonCriticalExtension        RRCConnectionReconfiguration-v1020-IEs  OPTIONAL
}
RRCConnectionReconfiguration-v1020-IEs ::= SEQUENCE {
    sCellToReleaseList-r10      SCellToReleaseList-r10                  OPTIONAL,    --
Need ON
    sCellToAddModList-r10       SCellToAddModList-r10                   OPTIONAL, --
Need ON
    nonCriticalExtension        RRCConnectionReconfiguration-v1130-IEs  OPTIONAL
}
RRCConnectionReconfiguration-v1130-IEs ::= SEQUENCE {
    systemInfomationBlockType1Dedicated-r11     OCTET STRING (CONTAINING
SystemInformationBlockType1)                    OPTIONAL,               -- Need ON
    nonCriticalExtension        RRCConnectionReconfiguration-v1250-IEs  OPTIONAL
}
RRCConnectionReconfiguration-v1250-IEs ::= SEQUENCE {
    wlan-OffloadInfo-r12            CHOICE {
        release                     NULL,
        setup                       SEQUENCE {
            wlan-OffloadConfigDedicated-r12     WLAN-OffloadConfig-r12,
            t350-r12                ENUMERATED {min5, min10, min20, min30,
min60,
                                    min120, min 180, spare1}OPTIONAL -- Need
OR
        }
    }                                                                   OPTIONAL,    --
Need ON
    scg-Configuration-r12       SCG-Configuration-r12                   OPTIONAL,    -- Cond
nonFullConfig
    sl-SyncTxControl-r12        SL-SyncTxControl-r12                    OPTIONAL,    --
Need ON
    sl-DiscConfig-r12           SL-DiscConfig-r12                       OPTIONAL,    --
Need ON
    sl-CommConfig-r12           SL-CommConfig-r12                       OPTIONAL,    --
Need ON
    nonCriticalExtension        RRCConnectionReconfiguration-v1300-IEs
    OPTIONAL
}
RRCConnectionReconfiguration-v1250-IEs ::= SEQUENCE {
    wlan-ControlInfo-r13        ENUMERATED {on, off}                    OPTIONAL,
    nonCriticalExtension        SEQUENCE{ }                             OPTIONAL
}
SL-SyncTxControl-r12 ::=        SEQUENCE {
    networkControlledSyncTx-r12         ENUMERATED {on, off}            OPTIONAL --
Need OP
}
PSCellToAddMod-r12 ::=          SEQUENCE {
    sCellIndex-r12                  SCellIndex-r10,
    cellIdentification-r12          SEQUENCE {
        physCellId-r12                  PhysCellId,
        dl-CarrierFreq-r12              ARFCN-ValueEUTRA-r9
    }                                                                   OPTIONAL,    --
Cond SCellAdd
    radioResourceConfigCommonPSCell-r12     RadioResourceConfigCommonPSCell-r12
        OPTIONAL,       -- Cond SCellAdd
    radioResourceConfigDedicatedPSCell-r12 RadioResourceConfigDedicatedPSCell-r12
        OPTIONAL,       -- Cond SCellAdd2
    ...
}
PowerCoordinationInfo-r12 ::= SEQUENCE {
    p-MeNB-r12                  INTEGER (1..16),
    p-SeNB-r12                  INTEGER (1..16),
    powerControlMode-r12        INTEGER (1..2)
}
SCellToAddModList-r10 ::=       SEQUENCE (SIZE (1..maxSCell-r10)) OF SCellToAddMod-r10
SCellToAddMod-r10 ::=           SEQUENCE {
    sCellIndex-r10                  SCellIndex-r10,
```

-continued

```
  cellIdentification-r10              SEQUENCE {
    physCellId-r10                      PhysCellId,
    dl-CarrierFreq-r10                  ARFCN-ValueEUTRA
  }                                                             OPTIONAL,    -- Cond
SCellAdd
  radioResourceConfigCommonSCell-r10   RadioResourceConfigCommonSCell-r10
OPTIONAL,    -- Cond SCellAdd
  radioResourceConfigDedicatedSCell-r10 RadioResourceConfigDedicatedSCell-r10
OPTIONAL,    -- Cond SCellAdd2
  ...,
  [[ dl-CarrierFreq-v1090              ARFCN-ValueEUTRA-v9e0 OPTIONAL -- Cond
EARFCN-max
  ]]
}
SCellToReleaseList-r10 ::=   SEQUENCE (SIZE (1..maxSCell-r10)) OF SCellIndex-r10
SCG-Configuration-r12 ::=    CHOICE {
    release                      NULL,
    setup                        SEQUENCE {
      scg-ConfigPartMCG-r12        SEQUENCE {
        scg-Counter-r12              INTEGER (0.. 65535)         OPTIONAL,    --
Need ON
        powerCoordinationInfo-r12    PowerCoordinationInfo-r12   OPTIONAL,    --
Need ON
        ...
      }                                                          OPTIONAL,    --
Need ON
      scg-ConfigPartSCG-r12        SCG-ConfigPartSCG-r12         OPTIONAL --
Need ON
    }
  }
SCG-ConfigPartSCG-r12 ::=    SEQUENCE {
  radioResourceConfigDedicatedSCG-r12  RadioResourceConfigDedicatedSCG-r12
OPTIONAL,    -- Need ON
  sCellToReleaseListSCG-r12    SCellToReleaseList-r10            OPTIONAL,    -- Need
ON
  pSCellToAddMod-r12           PSCellToAddMod-r12                OPTIONAL,    --
Need ON
  sCellToAddModListSCG-r12     SCellToAddModList-r10             OPTIONAL,    -- Need
ON
  mobilityControlInfoSCG-r12   MobilityControlInfoSCG-r12        OPTIONAL,    -- Need
ON
  ...
}
SecurityConfigHO ::=         SEQUENCE {
  handoverType                 CHOICE {
    intraLTE                     SEQUENCE {
      securityAlgorithmConfig      SecurityAlgorithmConfig       OPTIONAL,    --
Cond fullConfig
      keyChangeIndicator           BOOLEAN,
      nextHopChainingCount         NextHopChainingCount
    },
    interRAT                     SEQUENCE {
      securityAlgorithmConfig      SecurityAlgorithmConfig,
      nas-SecurityParamToEUTRA     OCTET STRING (SIZE(6))
    }
  },
  ...
}
-- ASN1STOP
```

| Conditional presence | Explanation |
|---|---|
| EARFCN-max | The field is mandatory present if dl-CarrierFreq-r10 is included and set to maxEARFCN. Otherwise the field is not present. |
| fullConfig | This field is mandatory present for handover within E-UTRA when the fullConfig is included; otherwise it is optionally present, Need OP. |
| HO | The field is mandatory present in case of handover within E- UTRA or to E-UTRA; otherwise the field is not present. |
| HO-Reestab | This field is optionally present, need ON, in case of handover within E-UTRA or upon the first reconfiguration after RRC connection re-establishment; otherwise the field is not present. |

-continued

| Conditional presence | Explanation |
|---|---|
| HO-toEUTRA | The field is mandatory present in case of handover to E-UTRA or for reconfigurations when fullConfig is included; otherwise the field is optionally present, need ON. |
| nonFullConfig | The field is not present in case of handover within E-UTRA when the fullConfig is included or in case of handover to E-UTRA; otherwise it is optional present, need ON. |
| nonHO | The field is not present in case of handover within E-UTRA or to E-UTRA; otherwise it is optional present, need ON. |

-continued

| Conditional presence | Explanation |
|---|---|
| SCellAdd | The field is mandatory present upon SCell addition; otherwise it is not present. |
| SCellAdd2 | The field is mandatory present upon SCell addition; otherwise it is optionally present, need ON. |

In some demonstrative embodiments, connection manager 145 may be configured to cause UE 102 may be configured to report back to the network, e.g., to the operator of CN 160, whether an operation according to a received WLAN control indication was successfully performed.

In some demonstrative embodiments, connection manager 145 may be configured to process an ANDSF MO including one or more parameters to indicate one or more criteria to turn WLAN TRx 147 on or off, for example, based on a location of UE 102, a time of day, and/or one or more other parameters and/or criteria.

In some demonstrative embodiments, connection manager 145 may be configured to control WLAN TRx 147 according to the one or more WLAN control indications, e.g., received via the RRC signaling and/or the ANDSF MO, for example, only to operator-deployed WLAN networks, and only if allowed by the user of UE 102, e.g., if the user of UE selects a global no-user-preference WLAN setting, if the user configures both the operator-deployed WLAN setting and the non-operator-deployed WLAN setting to no-user-preference, or if the user configures the operator-deployed WLAN setting to no-user-preference and the user has not manually configured any user-defined WLAN identifiers.

In some demonstrative embodiments, connection manager 145 may be configured to control the operation of WLAN TRx 147 based on one or more additional or alternative criteria, for example, even without an explicit WLAN control indication from the network.

In some demonstrative embodiments, connection manager 145 may be configured to turn WLAN TRx 147 on or off based on one or more selected WLAN settings, for example, according to on one or more criteria, for example, even without receiving an explicit "WLAN on" or "WLAN off" indication from CN 160.

In some demonstrative embodiments, for example, when no user-defined WLAN is defined for the UE 102 and the selected WLAN setting, as selected by the user of UE 102, includes the WLAN-no-user-preference setting, connection manager 145 may turn-off the WLAN TRx 147, for example, when UE 102 is not within coverage of an operator-deployed WLAN. Connection manager 145 may be configured to determine whether or not UE 102 is within the coverage of an operator-deployed WLAN, for example, based on RRC signaling and/or ANDSF MO, which may include, for example, WLAN AP location information, e.g., in addition to one or more WLAN identifiers.

Figure 3:
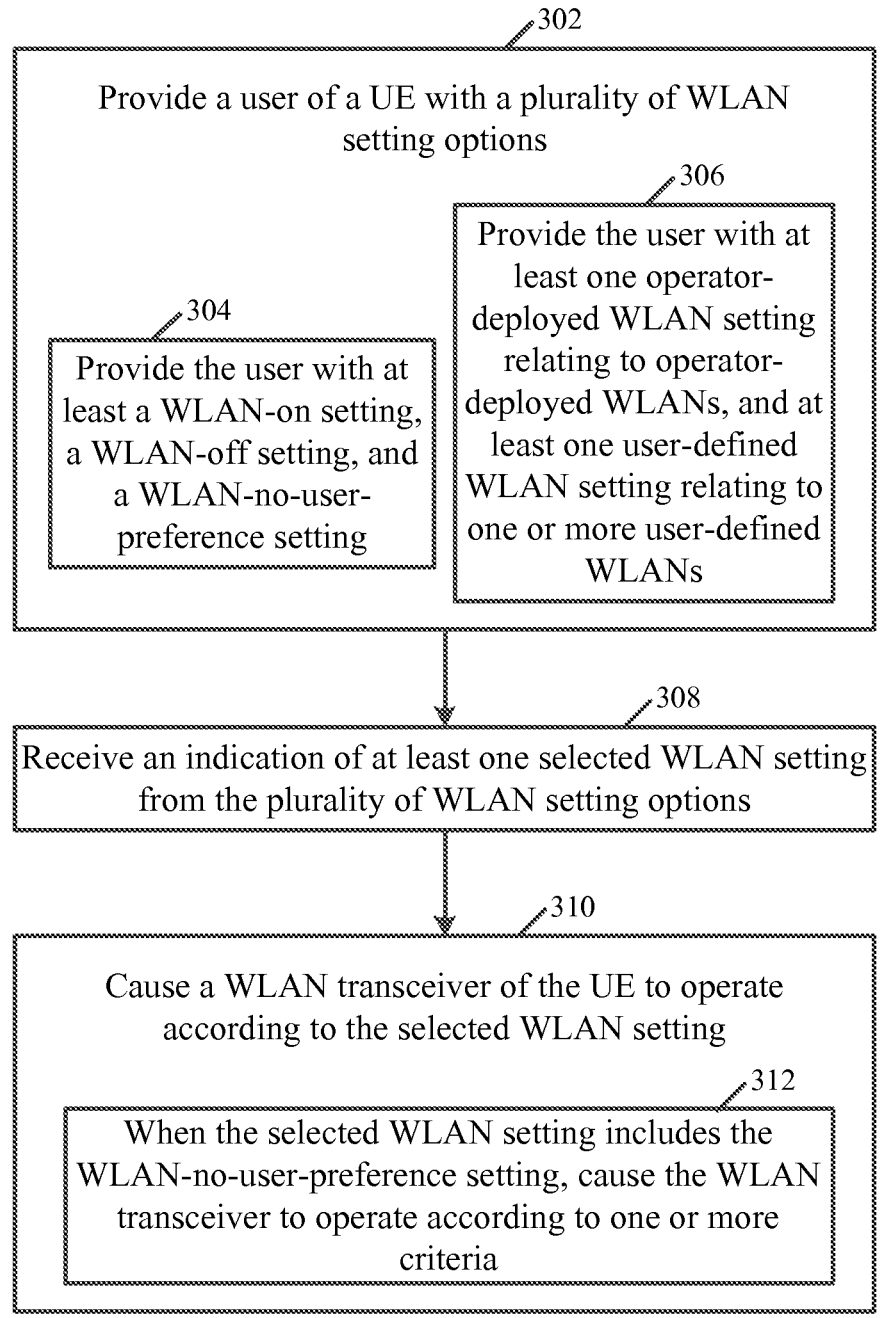
FIG. 3 is a schematic flow-chart illustration of a method of operating a UE according to a Wireless Local Area Network (WLAN) setting, in accordance with some demonstrative embodiments.

FIG. 3 is a schematic flow-chart illustration of a method of operating a UE according to a WLAN setting, in accordance with some demonstrative embodiments. In some embodiments, one or more of the operations of the method of FIG. 3 may be performed by a wireless communication system, e.g., system 100 (FIG. 1); a UE, e.g., UE 102 (FIG. 1); a user interface, e.g., user interface 148 (FIG. 1), and/or a connection manager, e.g., connection manager 145 (FIG. 1).

As indicated at block 302, the method may include providing a user of a UE with a plurality of WLAN setting options. For example, user interface 148 (FIG. 1) may provide the user of UE 102 (FIG. 1) with a plurality of WLAN setting options, e.g., as described above.

As indicated at block 304, the plurality of WLAN setting options may include at least a WLAN-on setting, a WLAN-off setting, and a WLAN-no-user-preference setting. For example, user interface 148 (FIG. 1) may provide the user of UE 102 (FIG. 1) with at least a WLAN-on setting, a WLAN-off setting, and a WLAN-no-user-preference setting, e.g., as described above.

As indicated at block 306, the plurality of WLAN setting options may include at least one operator-deployed WLAN setting relating to operator-deployed WLANs, and at least one user-defined WLAN setting relating to one or more user-defined WLANs. For example, user interface 148 (FIG. 1) may provide the user of UE 102 (FIG. 1) with at least one operator-deployed WLAN setting relating to operator-deployed WLANs, and at least one user-defined WLAN setting relating to one or more user-defined WLANs, e.g., as described above.

As indicated at block 308, the method may include receiving an indication of a selected WLAN setting from the plurality of WLAN setting options. For example, user interface 148 (FIG. 1) may receive an indication of the selected WLAN setting, e.g., as selected by the user of UE 102 (FIG. 1), e.g., as described above.

As indicated at block 310, the method may include causing a WLAN transceiver of the UE to operate according to the selected WLAN setting. For example, connection manager 145 (FIG. 1) may cause WLAN TRx 147 (FIG. 1) to operate according to the selected WLAN setting, e.g., as described above.

As indicated at block 312, the method may include, when the selected WLAN setting includes the WLAN-no-user-preference setting, causing the WLAN transceiver to operate according to one or more criteria. For example, connection manager 145 (FIG. 1) may cause WLAN TRx 147 (FIG. 1) to operate according to one or more criteria, for example, when the selected WLAN setting includes the WLAN-no-user-preference setting, e.g., as described above.

Reference is made to FIG. 4, which schematically illustrates a product of manufacture 400, in accordance with some demonstrative embodiments. Product 400 may include a non-transitory machine-readable storage medium 402 to store logic 404, which may be used, for example, to perform at least part of the functionality of UE 102 (FIG. 1), UE 200 (FIG. 2), user interface 148 (FIG. 1), and/or connection manager 145 (FIG. 1), and/or to perform one or more operations of the method of FIG. 3. The phrase "non-transitory machine-readable medium" is directed to include all computer-readable media, with the sole exception being a transitory propagating signal.

In some demonstrative embodiments, product 400 and/or machine-readable storage medium 402 may include one or more types of computer-readable storage media capable of storing data, including volatile memory, non-volatile memory, removable or non-removable memory, erasable or non-erasable memory, writeable or re-writeable memory, and the like. For example, machine-readable storage medium 402 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 404 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 404 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes a User Equipment (UE) comprising a Wireless Local Area Network (WLAN) transceiver to communicate with a WLAN; a cellular transceiver to communicate with a cellular network; a user interface to provide a user with a plurality of WLAN setting options and to receive an indication of a selected WLAN setting from the plurality of WLAN setting options, the plurality of WLAN setting options comprising at least a WLAN-on setting, a WLAN-off setting, and a WLAN-no-user-preference setting; and a connection manager to cause the WLAN transceiver to operate according to the selected WLAN setting, the connection manager to cause the WLAN transceiver to operate according to one or more criteria, when the selected WLAN setting comprises the WLAN-no-user-preference setting.

Example 2 includes the subject matter of Example 1, and optionally, wherein the one or more criteria comprise at least one operator setting from an operator of the cellular network.

Example 3 includes the subject matter of Example 2, and optionally, wherein, when the selected WLAN setting comprises the WLAN-no-user-preference setting, the connection manager is to turn the WLAN transceiver on or off based on a WLAN on/off indication from the operator.

Example 4 includes the subject matter of Example 2 or 3, and optionally, wherein the cellular transceiver is to receive a Radio Resource Control (RRC) message comprising the operator setting.

Example 5 includes the subject matter of Example 2 or 3, and optionally, wherein the operator setting is to be received by the UE in an Access Network and Selection Function (ANDSF) management Object (MO).

Example 6 includes the subject matter of any one of Examples 1-5, and optionally, wherein, when no user-defined WLAN is defined for the UE and the selected WLAN setting comprises the WLAN-no-user-preference setting, the connection manager is to turn-off the WLAN transceiver, when the UE is not within coverage of an operator-deployed WLAN.

Example 7 includes the subject matter of any one of Examples 1-6, and optionally, wherein the plurality of WLAN setting options comprise at least one operator-deployed WLAN setting relating to operator-deployed WLANs, and at least one user-defined WLAN setting relating to one or more user-defined WLANs.

Example 8 includes the subject matter of Example 7, and optionally, wherein the at least one operator-deployed WLAN setting comprises at least an operator-deployed WLAN-on setting, and an operator-deployed WLAN-off setting.

Example 9 includes the subject matter of Example 7 or 8, and optionally, wherein the at least one operator-deployed WLAN setting comprises at least an operator-deployed WLAN-no-user-preference setting.

Example 10 includes the subject matter of any one of Examples 7-9, and optionally, wherein the at least one user-defined WLAN setting comprises at least a user-defined WLAN-on setting, and a user-defined WLAN-off setting.

Example 11 includes the subject matter of any one of Examples 7-10, and optionally, wherein the at least one user-defined WLAN setting comprises at least a user-defined WLAN-no-user-preference setting.

Example 12 includes the subject matter of any one of Examples 1-11, and optionally, wherein the plurality of WLAN setting options comprise at least one global WLAN setting relating to both operator-deployed WLANs and user-defined WLANs.

Example 13 includes the subject matter of Example 12, and optionally, wherein the at least one global WLAN setting comprises at least a global WLAN-no-user-preference setting.

Example 14 includes the subject matter of any one of Examples 1-13, and optionally, comprising one or more antennas, a memory and a processor.

Example 15 includes a User Equipment (UE) comprising a Wireless Local Area Network (WLAN) transceiver to communicate with a WLAN network; a cellular transceiver to communicate with a cellular network; a user interface to provide a user with a plurality of WLAN setting options and to receive an indication of a selected WLAN setting from the plurality of WLAN setting options, the plurality of WLAN setting options comprising at least one operator-deployed WLAN setting relating to operator-deployed WLANs, and at least one user-defined WLAN setting relating to one or more user-defined WLANs; and a connection manager to cause the WLAN transceiver to operate according to the selected WLAN setting.

Example 16 includes the subject matter of Example 15, and optionally, wherein, when the selected WLAN setting comprises the operator-deployed WLAN setting, the connection manager is to turn the WLAN transceiver on or off based on at least one operator setting from an operator of the cellular network.

Example 17 includes the subject matter of Example 16, and optionally, wherein the operator setting comprises a WLAN on/off indication from the operator.

Example 18 includes the subject matter of Example 16 or 17, and optionally, wherein the cellular transceiver is to receive a Radio Resource Control (RRC) message comprising the operator setting.

Example 19 includes the subject matter of Example 16 or 17, and optionally, wherein the operator setting is to be received by the UE in an Access Network and Selection Function (ANDSF) management Object (MO).

Example 20 includes the subject matter of any one of Examples 15-19, and optionally, wherein the plurality of WLAN setting options comprise at least one global WLAN setting relating to both operator-deployed WLANs and user-defined WLANs.

Example 21 includes the subject matter of Example 20, and optionally, wherein the at least one global WLAN setting comprises at least a global WLAN-no-user-preference setting.

Example 22 includes the subject matter of any one of Examples 15-21, and optionally, wherein the plurality of WLAN setting options comprise at least one WLAN-on setting, at least one WLAN-off setting, and at least one WLAN-no-user-preference setting.

Example 23 includes the subject matter of Example 22, and optionally, wherein the at least one operator-deployed WLAN setting comprises at least an operator-deployed WLAN-on setting, and an operator-deployed WLAN-off setting.

Example 24 includes the subject matter of Example 22 or 23, and optionally, wherein the at least one operator-deployed WLAN setting comprises at least an operator-deployed WLAN-no-user-preference setting.

Example 25 includes the subject matter of any one of Examples 22-24, and optionally, wherein the at least one user-defined WLAN setting comprises at least a user-defined WLAN-on setting, and a user-defined WLAN-off setting.

Example 26 includes the subject matter of any one of Examples 22-25, and optionally, wherein the at least one user-defined WLAN setting comprises at least a user-defined WLAN-no-user-preference setting.

Example 27 includes the subject matter of any one of Examples 22-26, and optionally, wherein, when no user-defined WLAN is defined for the UE and the selected WLAN setting comprises the WLAN-no-user-preference setting, the connection manager is to turn-off the WLAN transceiver, when the UE is not within coverage of an operator-deployed WLAN.

Example 28 includes the subject matter of any one of Examples 15-27, and optionally, comprising one or more antennas, a memory and a processor.

Example 29 includes an apparatus comprising circuitry and logic configured to cause a User Equipment (UE) to provide a user with a plurality of Wireless Local Area Network (WLAN) setting options, the plurality of WLAN setting options comprising at least a WLAN-on setting, a WLAN-off setting, and a WLAN-no-user-preference setting; receive an indication of a selected WLAN setting from the plurality of WLAN setting options; and cause a WLAN transceiver of the UE to operate according to the selected WLAN setting, and when the selected WLAN setting comprises the WLAN-no-user-preference setting, to cause the WLAN transceiver to operate according to one or more criteria.

Example 30 includes the subject matter of Example 29, and optionally, wherein the one or more criteria comprise at least one operator setting from an operator of a cellular network.

Example 31 includes the subject matter of Example 30, and optionally, wherein the apparatus is configured to cause the UE to, when the selected WLAN setting comprises the WLAN-no-user-preference setting, turn the WLAN transceiver on or off based on a WLAN on/off indication from the operator.

Example 32 includes the subject matter of Example 30 or 31, and optionally, wherein the apparatus is configured to cause the UE to process a Radio Resource Control (RRC) message comprising the operator setting.

Example 33 includes the subject matter of Example 30 or 31, and optionally, wherein the apparatus is configured to cause the UE to process the operator setting to be received in an Access Network and Selection Function (ANDSF) management Object (MO).

Example 34 includes the subject matter of any one of Examples 29-33, and optionally, wherein the apparatus is configured to cause the UE to, when no user-defined WLAN is defined for the UE and the selected WLAN setting comprises the WLAN-no-user-preference setting, turn-off the WLAN transceiver, when the UE is not within coverage of an operator-deployed WLAN.

Example 35 includes the subject matter of any one of Examples 29-34, and optionally, wherein the plurality of WLAN setting options comprise at least one operator-deployed WLAN setting relating to operator-deployed WLANs, and at least one user-defined WLAN setting relating to one or more user-defined WLANs.

Example 36 includes the subject matter of Example 35, and optionally, wherein the at least one operator-deployed WLAN setting comprises at least an operator-deployed WLAN-on setting, and an operator-deployed WLAN-off setting.

Example 37 includes the subject matter of Example 35 or 36, and optionally, wherein the at least one operator-deployed WLAN setting comprises at least an operator-deployed WLAN-no-user-preference setting.

Example 38 includes the subject matter of any one of Examples 35-37, and optionally, wherein the at least one user-defined WLAN setting comprises at least a user-defined WLAN-on setting, and a user-defined WLAN-off setting.

Example 39 includes the subject matter of any one of Examples 35-38, and optionally, wherein the at least one user-defined WLAN setting comprises at least a user-defined WLAN-no-user-preference setting.

Example 40 includes the subject matter of any one of Examples 29-39, and optionally, wherein the plurality of WLAN setting options comprise at least one global WLAN setting relating to both operator-deployed WLANs and user-defined WLANs.

Example 41 includes the subject matter of Example 40, and optionally, wherein the at least one global WLAN setting comprises at least a global WLAN-no-user-preference setting.

Example 42 includes the subject matter of any one of Examples 29-41, and optionally, comprising the WLAN transceiver and a cellular transceiver.

Example 43 includes the subject matter of any one of Examples 29-42, and optionally, comprising one or more antennas, a memory and a processor.

Example 44 includes an apparatus comprising circuitry and logic configured to cause a User Equipment (UE) to provide a user with a plurality of Wireless Local Area Network (WLAN) setting options, the plurality of WLAN setting options comprising at least one operator-deployed WLAN setting relating to operator-deployed WLANs, and at least one user-defined WLAN setting relating to one or more user-defined WLANs; receive an indication of a selected WLAN setting from the plurality of WLAN setting options; and cause a WLAN transceiver of the UE to operate according to the selected WLAN setting.

Example 45 includes the subject matter of Example 44, and optionally, wherein the apparatus is configured to cause the UE to, when the selected WLAN setting comprises the operator-deployed WLAN setting, turn the WLAN transceiver on or off based on at least one operator setting from an operator of the cellular network.

Example 46 includes the subject matter of Example 45, and optionally, wherein the operator setting comprises a WLAN on/off indication from the operator.

Example 47 includes the subject matter of Example 45 or 46, and optionally, wherein the apparatus is configured to cause the UE to process a Radio Resource Control (RRC) message comprising the operator setting.

Example 48 includes the subject matter of Example 45 or 46, and optionally, wherein the apparatus is configured to cause the UE to process the operator setting to be received in an Access Network and Selection Function (ANDSF) management Object (MO).

Example 49 includes the subject matter of any one of Examples 44-48, and optionally, wherein the plurality of WLAN setting options comprise at least one global WLAN setting relating to both operator-deployed WLANs and user-defined WLANs.

Example 50 includes the subject matter of Example 49, and optionally, wherein the at least one global WLAN setting comprises at least a global WLAN-no-user-preference setting.

Example 51 includes the subject matter of any one of Examples 44-50, and optionally, wherein the plurality of WLAN setting options comprise at least one WLAN-on setting, at least one WLAN-off setting, and at least one WLAN-no-user-preference setting.

Example 52 includes the subject matter of Example 51, and optionally, wherein the at least one operator-deployed WLAN setting comprises at least an operator-deployed WLAN-on setting, and an operator-deployed WLAN-off setting.

Example 53 includes the subject matter of Example 51 or 52, and optionally, wherein the at least one operator-deployed WLAN setting comprises at least an operator-deployed WLAN-no-user-preference setting.

Example 54 includes the subject matter of any one of Examples 51-53, and optionally, wherein the at least one user-defined WLAN setting comprises at least a user-defined WLAN-on setting, and a user-defined WLAN-off setting.

Example 55 includes the subject matter of any one of Examples 51-54, and optionally, wherein the at least one user-defined WLAN setting comprises at least a user-defined WLAN-no-user-preference setting.

Example 56 includes the subject matter of any one of Examples 51-55, and optionally, wherein the apparatus is configured to cause the UE to, when no user-defined WLAN is defined for the UE and the selected WLAN setting comprises the WLAN-no-user-preference setting, turn-off the WLAN transceiver, when the UE is not within coverage of an operator-deployed WLAN.

Example 57 includes the subject matter of any one of Examples 44-56, and optionally, comprising the WLAN transceiver and a cellular transceiver.

Example 58 includes the subject matter of any one of Examples 44-57, and optionally, comprising one or more antennas, a memory and a processor.

Example 59 includes a method to be performed by a User Equipment (UE), the method comprising providing a user with a plurality of Wireless Local Area Network (WLAN) setting options, the plurality of WLAN setting options comprising at least a WLAN-on setting, a WLAN-off setting, and a WLAN-no-user-preference setting; receiving an indication of a selected WLAN setting from the plurality of WLAN setting options; and causing a WLAN transceiver of the UE to operate according to the selected WLAN setting, and when the selected WLAN setting comprises the WLAN-no-user-preference setting, to cause the WLAN transceiver to operate according to one or more criteria.

Example 60 includes the subject matter of Example 59, and optionally, wherein the one or more criteria comprise at least one operator setting from an operator of a cellular network.

Example 61 includes the subject matter of Example 60, and optionally, comprising, when the selected WLAN setting comprises the WLAN-no-user-preference setting, turning the WLAN transceiver on or off based on a WLAN on/off indication from the operator.

Example 62 includes the subject matter of Example 60 or 61, and optionally, comprising processing a received Radio Resource Control (RRC) message comprising the operator setting.

Example 63 includes the subject matter of Example 60 or 61, and optionally, comprising processing the operator setting received in an Access Network and Selection Function (ANDSF) management Object (MO).

Example 64 includes the subject matter of any one of Examples 59-63, and optionally, comprising, when no user-defined WLAN is defined for the UE and the selected WLAN setting comprises the WLAN-no-user-preference setting, turning off the WLAN transceiver, when the UE is not within coverage of an operator-deployed WLAN.

Example 65 includes the subject matter of any one of Examples 59-64, and optionally, wherein the plurality of WLAN setting options comprise at least one operator-deployed WLAN setting relating to operator-deployed WLANs, and at least one user-defined WLAN setting relating to one or more user-defined WLANs.

Example 66 includes the subject matter of Example 65, and optionally, wherein the at least one operator-deployed WLAN setting comprises at least an operator-deployed WLAN-on setting, and an operator-deployed WLAN-off setting.

Example 67 includes the subject matter of Example 65 or 66, and optionally, wherein the at least one operator-deployed WLAN setting comprises at least an operator-deployed WLAN-no-user-preference setting.

Example 68 includes the subject matter of any one of Examples 65-67, and optionally, wherein the at least one user-defined WLAN setting comprises at least a user-defined WLAN-on setting, and a user-defined WLAN-off setting.

Example 69 includes the subject matter of any one of Examples 65-68, and optionally, wherein the at least one user-defined WLAN setting comprises at least a user-defined WLAN-no-user-preference setting.

Example 70 includes the subject matter of any one of Examples 59-69, and optionally, wherein the plurality of WLAN setting options comprise at least one global WLAN setting relating to both operator-deployed WLANs and user-defined WLANs.

Example 71 includes the subject matter of Example 70, and optionally, wherein the at least one global WLAN setting comprises at least a global WLAN-no-user-preference setting.

Example 72 includes a method to be performed at a User Equipment (UE), the method comprising providing a user with a plurality of Wireless Local Area Network (WLAN) setting options, the plurality of WLAN setting options comprising at least one operator-deployed WLAN setting relating to operator-deployed WLANs, and at least one user-defined WLAN setting relating to one or more user-defined WLANs; receiving an indication of a selected WLAN setting from the plurality of WLAN setting options; and causing a WLAN transceiver of the UE to operate according to the selected WLAN setting.

Example 73 includes the subject matter of Example 72, and optionally, comprising, when the selected WLAN setting comprises the operator-deployed WLAN setting, turning the WLAN transceiver on or off based on at least one operator setting from an operator of the cellular network.

Example 74 includes the subject matter of Example 73, and optionally, wherein the operator setting comprises a WLAN on/off indication from the operator.

Example 75 includes the subject matter of Example 73 or 74, and optionally, comprising processing a received Radio Resource Control (RRC) message comprising the operator setting.

Example 76 includes the subject matter of Example 73 or 74, and optionally, comprising processing the operator setting received in an Access Network and Selection Function (ANDSF) management Object (MO).

Example 77 includes the subject matter of any one of Examples 72-76, and optionally, wherein the plurality of WLAN setting options comprise at least one global WLAN setting relating to both operator-deployed WLANs and user-defined WLANs.

Example 78 includes the subject matter of Example 77, and optionally, wherein the at least one global WLAN setting comprises at least a global WLAN-no-user-preference setting.

Example 79 includes the subject matter of any one of Examples 72-78, and optionally, wherein the plurality of WLAN setting options comprise at least one WLAN-on setting, at least one WLAN-off setting, and at least one WLAN-no-user-preference setting.

Example 80 includes the subject matter of Example 79, and optionally, wherein the at least one operator-deployed WLAN setting comprises at least an operator-deployed WLAN-on setting, and an operator-deployed WLAN-off setting.

Example 81 includes the subject matter of Example 79 or 80, and optionally, wherein the at least one operator-deployed WLAN setting comprises at least an operator-deployed WLAN-no-user-preference setting.

Example 82 includes the subject matter of any one of Examples 79-81, and optionally, wherein the at least one user-defined WLAN setting comprises at least a user-defined WLAN-on setting, and a user-defined WLAN-off setting.

Example 83 includes the subject matter of any one of Examples 79-82, and optionally, wherein the at least one user-defined WLAN setting comprises at least a user-defined WLAN-no-user-preference setting.

Example 84 includes the subject matter of any one of Examples 79-83, and optionally, comprising, when no user-defined WLAN is defined for the UE and the selected WLAN setting comprises the WLAN-no-user-preference setting, turning off the WLAN transceiver, when the UE is not within coverage of an operator-deployed WLAN.

Example 85 includes a product comprising one or more tangible computer-readable non-transitory storage media comprising computer-executable instructions operable to, when executed by at least one computer processor, enable the at least one computer processor to implement one or more operations at User Equipment (UE), the operations comprising providing a user with a plurality of Wireless Local Area Network (WLAN) setting options, the plurality of WLAN setting options comprising at least a WLAN-on setting, a WLAN-off setting, and a WLAN-no-user-preference setting; receiving an indication of a selected WLAN setting from the plurality of WLAN setting options; and causing a WLAN transceiver of the UE to operate according to the selected WLAN setting, and when the selected WLAN setting comprises the WLAN-no-user-preference setting, to cause the WLAN transceiver to operate according to one or more criteria.

Example 86 includes the subject matter of Example 85, and optionally, wherein the one or more criteria comprise at least one operator setting from an operator of a cellular network.

Example 87 includes the subject matter of Example 86, and optionally, wherein the operations comprise, when the selected WLAN setting comprises the WLAN-no-user-preference setting, turning the WLAN transceiver on or off based on a WLAN on/off indication from the operator.

Example 88 includes the subject matter of Example 86 or 87, and optionally, wherein the operations comprise processing a received Radio Resource Control (RRC) message comprising the operator setting.

Example 89 includes the subject matter of Example 86 or 87, and optionally, wherein the operations comprise processing the operator setting received in an Access Network and Selection Function (ANDSF) management Object (MO).

Example 90 includes the subject matter of any one of Examples 85-89, and optionally, wherein the operations comprise, when no user-defined WLAN is defined for the UE and the selected WLAN setting comprises the WLAN-no-user-preference setting, turning off the WLAN transceiver, when the UE is not within coverage of an operator-deployed WLAN.

Example 91 includes the subject matter of any one of Examples 85-90, and optionally, wherein the plurality of WLAN setting options comprise at least one operator-deployed WLAN setting relating to operator-deployed WLANs, and at least one user-defined WLAN setting relating to one or more user-defined WLANs.

Example 92 includes the subject matter of Example 91, and optionally, wherein the at least one operator-deployed WLAN setting comprises at least an operator-deployed WLAN-on setting, and an operator-deployed WLAN-off setting.

Example 93 includes the subject matter of Example 91 or 92, and optionally, wherein the at least one operator-deployed WLAN setting comprises at least an operator-deployed WLAN-no-user-preference setting.

Example 94 includes the subject matter of any one of Examples 91-93, and optionally, wherein the at least one user-defined WLAN setting comprises at least a user-defined WLAN-on setting, and a user-defined WLAN-off setting.

Example 95 includes the subject matter of any one of Examples 91-94, and optionally, wherein the at least one user-defined WLAN setting comprises at least a user-defined WLAN-no-user-preference setting.

Example 96 includes the subject matter of any one of Examples 85-96, and optionally, wherein the plurality of WLAN setting options comprise at least one global WLAN setting relating to both operator-deployed WLANs and user-defined WLANs.

Example 97 includes the subject matter of Example 96, and optionally, wherein the at least one global WLAN setting comprises at least a global WLAN-no-user-preference setting.

Example 98 includes a product comprising one or more tangible computer-readable non-transitory storage media comprising computer-executable instructions operable to, when executed by at least one computer processor, enable the at least one computer processor to implement one or more operations at User Equipment (UE), the operations comprising providing a user with a plurality of Wireless Local Area Network (WLAN) setting options, the plurality of WLAN setting options comprising at least one operator-deployed WLAN setting relating to operator-deployed WLANs, and at least one user-defined WLAN setting relating to one or more user-defined WLANs; receiving an indication of a selected WLAN setting from the plurality of WLAN setting options; and causing a WLAN transceiver of the UE to operate according to the selected WLAN setting.

Example 99 includes the subject matter of Example 98, and optionally, wherein the operations comprise, when the selected WLAN setting comprises the operator-deployed WLAN setting, turning the WLAN transceiver on or off based on at least one operator setting from an operator of the cellular network.

Example 100 includes the subject matter of Example 99, and optionally, wherein the operator setting comprises a WLAN on/off indication from the operator.

Example 101 includes the subject matter of Example 99 or 100, and optionally, wherein the operations comprise processing a received Radio Resource Control (RRC) message comprising the operator setting.

Example 102 includes the subject matter of Example 99 or 100, and optionally, wherein the operations comprise processing the operator setting received in an Access Network and Selection Function (ANDSF) management Object (MO).

Example 103 includes the subject matter of any one of Examples 98-102, and optionally, wherein the plurality of WLAN setting options comprise at least one global WLAN setting relating to both operator-deployed WLANs and user-defined WLANs.

Example 104 includes the subject matter of Example 103, and optionally, wherein the at least one global WLAN setting comprises at least a global WLAN-no-user-preference setting.

Example 105 includes the subject matter of any one of Examples 98-104, and optionally, wherein the plurality of WLAN setting options comprise at least one WLAN-on setting, at least one WLAN-off setting, and at least one WLAN-no-user-preference setting.

Example 106 includes the subject matter of Example 105, and optionally, wherein the at least one operator-deployed WLAN setting comprises at least an operator-deployed WLAN-on setting, and an operator-deployed WLAN-off setting.

Example 107 includes the subject matter of Example 105 or 106, and optionally, wherein the at least one operator-deployed WLAN setting comprises at least an operator-deployed WLAN-no-user-preference setting.

Example 108 includes the subject matter of any one of Examples 105-107, and optionally, wherein the at least one user-defined WLAN setting comprises at least a user-defined WLAN-on setting, and a user-defined WLAN-off setting.

Example 109 includes the subject matter of any one of Examples 105-108, and optionally, wherein the at least one user-defined WLAN setting comprises at least a user-defined WLAN-no-user-preference setting.

Example 110 includes the subject matter of any one of Examples 105-109, and optionally, wherein the operations comprise, when no user-defined WLAN is defined for the UE and the selected WLAN setting comprises the WLAN-no-user-preference setting, turning off the WLAN transceiver, when the UE is not within coverage of an operator-deployed WLAN.

Example 111 includes an apparatus to control communication by a User Equipment (UE), the apparatus comprising means for providing a user with a plurality of Wireless Local Area Network (WLAN) setting options, the plurality of WLAN setting options comprising at least a WLAN-on setting, a WLAN-off setting, and a WLAN-no-user-preference setting; means for receiving an indication of a selected WLAN setting from the plurality of WLAN setting options; and means for causing a WLAN transceiver of the UE to operate according to the selected WLAN setting, and when the selected WLAN setting comprises the WLAN-no-user-preference setting, to cause the WLAN transceiver to operate according to one or more criteria.

Example 112 includes the subject matter of Example 111, and optionally, wherein the one or more criteria comprise at least one operator setting from an operator of a cellular network.

Example 113 includes the subject matter of Example 112, and optionally, comprising means for, when the selected WLAN setting comprises the WLAN-no-user-preference setting, turning the WLAN transceiver on or off based on a WLAN on/off indication from the operator.

Example 114 includes the subject matter of Example 112 or 113, and optionally, comprising means for processing a received Radio Resource Control (RRC) message comprising the operator setting.

Example 115 includes the subject matter of Example 112 or 113, and optionally, comprising means for processing the operator setting received in an Access Network and Selection Function (ANDSF) management Object (MO).

Example 116 includes the subject matter of any one of Examples 111-115, and optionally, comprising means for, when no user-defined WLAN is defined for the UE and the selected WLAN setting comprises the WLAN-no-user-preference setting, turning off the WLAN transceiver, when the UE is not within coverage of an operator-deployed WLAN.

Example 117 includes the subject matter of any one of Examples 111-116, and optionally, wherein the plurality of WLAN setting options comprise at least one operator-deployed WLAN setting relating to operator-deployed WLANs, and at least one user-defined WLAN setting relating to one or more user-defined WLANs.

Example 118 includes the subject matter of Example 117, and optionally, wherein the at least one operator-deployed WLAN setting comprises at least an operator-deployed WLAN-on setting, and an operator-deployed WLAN-off setting.

Example 119 includes the subject matter of Example 117 or 118, and optionally, wherein the at least one operator-deployed WLAN setting comprises at least an operator-deployed WLAN-no-user-preference setting.

Example 120 includes the subject matter of any one of Examples 117-119, and optionally, wherein the at least one user-defined WLAN setting comprises at least a user-defined WLAN-on setting, and a user-defined WLAN-off setting.

Example 121 includes the subject matter of any one of Examples 117-120, and optionally, wherein the at least one user-defined WLAN setting comprises at least a user-defined WLAN-no-user-preference setting.

Example 122 includes the subject matter of any one of Examples 111-121, and optionally, wherein the plurality of WLAN setting options comprise at least one global WLAN setting relating to both operator-deployed WLANs and user-defined WLANs.

Example 123 includes the subject matter of Example 122, and optionally, wherein the at least one global WLAN setting comprises at least a global WLAN-no-user-preference setting.

Example 124 includes an apparatus to control communication by a User Equipment (UE), the apparatus comprising means for providing a user with a plurality of Wireless Local Area Network (WLAN) setting options, the plurality of WLAN setting options comprising at least one operator-deployed WLAN setting relating to operator-deployed WLANs, and at least one user-defined WLAN setting relating to one or more user-defined WLANs; means for receiving an indication of a selected WLAN setting from the plurality of WLAN setting options; and means for causing a WLAN transceiver of the UE to operate according to the selected WLAN setting.

Example 125 includes the subject matter of Example 124, and optionally, comprising means for, when the selected WLAN setting comprises the operator-deployed WLAN setting, turning the WLAN transceiver on or off based on at least one operator setting from an operator of the cellular network.

Example 126 includes the subject matter of Example 125, and optionally, wherein the operator setting comprises a WLAN on/off indication from the operator.

Example 127 includes the subject matter of Example 125 or 126, and optionally, comprising means for processing a received Radio Resource Control (RRC) message comprising the operator setting.

Example 128 includes the subject matter of Example 125 or 126, and optionally, comprising means for processing the operator setting received in an Access Network and Selection Function (ANDSF) management Object (MO).

Example 129 includes the subject matter of any one of Examples 124-128, and optionally, wherein the plurality of WLAN setting options comprise at least one global WLAN setting relating to both operator-deployed WLANs and user-defined WLANs.

Example 130 includes the subject matter of Example 129, and optionally, wherein the at least one global WLAN setting comprises at least a global WLAN-no-user-preference setting.

Example 131 includes the subject matter of any one of Examples 124-130, and optionally, wherein the plurality of WLAN setting options comprise at least one WLAN-on setting, at least one WLAN-off setting, and at least one WLAN-no-user-preference setting.

Example 132 includes the subject matter of Example 131, and optionally, wherein the at least one operator-deployed WLAN setting comprises at least an operator-deployed WLAN-on setting, and an operator-deployed WLAN-off setting.

Example 133 includes the subject matter of Example 131 or 132, and optionally, wherein the at least one operator-deployed WLAN setting comprises at least an operator-deployed WLAN-no-user-preference setting.

Example 134 includes the subject matter of any one of Examples 131-133, and optionally, wherein the at least one user-defined WLAN setting comprises at least a user-defined WLAN-on setting, and a user-defined WLAN-off setting.

Example 135 includes the subject matter of any one of Examples 131-134, and optionally, wherein the at least one user-defined WLAN setting comprises at least a user-defined WLAN-no-user-preference setting.

Example 136 includes the subject matter of any one of Examples 131-135, and optionally, comprising means for, when no user-defined WLAN is defined for the UE and the selected WLAN setting comprises the WLAN-no-user-preference setting, turning off the WLAN transceiver, when the UE is not within coverage of an operator-deployed WLAN.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. A User Equipment (UE) comprising:
    a Wireless Local Area Network (WLAN) transceiver to communicate with a WLAN;
    a cellular transceiver to communicate with a cellular network;
    a user interface to provide a user with a plurality of WLAN setting options comprising at least one global WLAN setting relating to both operator-deployed WLANs and user-defined WLANs, and to receive an indication of a selected WLAN setting from the plurality of WLAN setting options, the plurality of WLAN setting options comprising at least a WLAN-on setting, a WLAN-off setting, and a WLAN-no-user-preference setting; and
    a connection manager to cause the WLAN transceiver to operate according to the selected WLAN setting, the connection manager to cause the WLAN transceiver to operate according to one or more criteria, when the selected WLAN setting comprises the WLAN-no-user-preference setting.

2. The UE of claim 1, wherein the one or more criteria comprise at least one operator setting from an operator of the cellular network.

3. The UE of claim 2, wherein, when the selected WLAN setting comprises the WLAN-no-user-preference setting, the connection manager is to turn the WLAN transceiver on or off based on a WLAN on/off indication from the operator.

4. The UE of claim 2, wherein the cellular transceiver is to receive a Radio Resource Control (RRC) message comprising the operator setting.

5. The UE of claim 2, wherein the operator setting is to be received by the UE in an Access Network and Selection Function (ANDSF) management Object (MO).

6. The UE of claim 1, wherein, when no user-defined WLAN is defined for the UE and the selected WLAN setting comprises the WLAN-no-user-preference setting, the connection manager is to turn-off the WLAN transceiver, when the UE is not within coverage of an operator-deployed WLAN.

7. The UE of claim 1, wherein the plurality of WLAN setting options comprise at least one operator-deployed WLAN setting relating to the operator-deployed WLANs, and at least one user-defined WLAN setting relating to one or more user-defined WLANs.

8. The UE of claim 7, wherein the at least one operator-deployed WLAN setting comprises at least an operator-deployed WLAN-on setting, and an operator-deployed WLAN-off setting.

9. The UE of claim 7, wherein the at least one operator-deployed WLAN setting comprises at least an operator-deployed WLAN-no-user-preference setting.

10. The UE of claim 7, wherein the at least one user-defined WLAN setting comprises at least a user-defined WLAN-on setting, and a user-defined WLAN-off setting.

11. The UE of claim 7, wherein the at least one user-defined WLAN setting comprises at least a user-defined WLAN-no-user-preference setting.

12. The UE of claim 1, wherein the at least one global WLAN setting comprises at least a global WLAN-no-user-preference setting.

13. The UE of claim 1 comprising one or more antennas, a memory and a processor.

14. A User Equipment (UE) comprising:
a Wireless Local Area Network (WLAN) transceiver to communicate with a WLAN network;
a cellular transceiver to communicate with a cellular network;
a user interface to provide a user with a plurality of WLAN setting options and to receive an indication of a selected WLAN setting from the plurality of WLAN setting options, the plurality of WLAN setting options comprising at least one global WLAN setting relating to both operator-deployed WLANs and user-defined WLANs, at least one operator-deployed WLAN setting relating to the operator-deployed WLANs, and at least one user-defined WLAN setting relating to one or more user-defined WLANs; and
a connection manager to cause the WLAN transceiver to operate according to the selected WLAN setting.

15. The UE of claim 14, wherein, when the selected WLAN setting comprises the operator-deployed WLAN setting, the connection manager is to turn the WLAN transceiver on or off based on at least one operator setting from an operator of the cellular network.

16. The UE of claim 14, wherein the at least one global WLAN setting comprises at least a global WLAN-no-user-preference setting.

17. The UE of claim 14, wherein the plurality of WLAN setting options comprise at least one WLAN-on setting, at least one WLAN-off setting, and at least one WLAN-no-user-preference setting.

18. A product comprising one or more tangible computer-readable non-transitory storage media comprising computer-executable instructions operable to, when executed by at least one processor, enable the at least one processor to cause a User Equipment (UE) to:
provide a user with a plurality of Wireless Local Area Network (WLAN) setting options comprising at least one global WEAN setting relating to both operator-deployed WLANs and user-defined WLANs, the plurality of WLAN setting options comprising at least a WLAN-on setting, a WLAN-off setting, and a WLAN-no-user-preference setting;
receive an indication of a selected WLAN setting from the plurality of WLAN setting options; and
cause a WLAN transceiver of the UE to operate according to the selected WLAN setting, and when the selected WLAN setting comprises the WLAN-no-user-preference setting, cause the WLAN transceiver to operate according to one or more criteria.

19. The product of claim 18, wherein the one or more criteria comprise at least one operator setting from an operator of a cellular network.

20. The product of claim 18, wherein the instructions when executed, cause the UE to, when no user-defined WLAN is defined for the UE and the selected WLAN setting comprises the WLAN-no-user-preference setting, turn off the WLAN transceiver, when the UE is not within coverage of an operator-deployed WLAN.

21. The product of claim 18, wherein the plurality of WLAN setting options comprise at least one operator-deployed WLAN setting relating to the operator-deployed WLANs, and at least one user-defined WLAN setting relating to one or more user-defined WLANs.

22. A product comprising one or more tangible computer-readable non-transitory storage media comprising computer-executable instructions operable to, when executed by at least one computer processor, enable the at least one processor to cause a User Equipment (UE) to:
provide a user with a plurality of Wireless Local Area Network (WLAN) setting options, the plurality of WLAN setting options comprising at least one global WLAN setting relating to both operator-deployed WLANs and user-defined WLANs, at least one operator-deployed WLAN setting relating to the operator-deployed WLANs, and at least one user-defined WLAN setting relating to one or more user-defined WLANs;
receive an indication of a selected WLAN setting from the plurality of WLAN setting options; and
cause a WLAN transceiver of the UE to operate according to the selected WLAN setting.

23. The product of claim 22, wherein the instructions, when, executed, cause the UE to, when the selected WLAN setting comprises the operator-deployed WLAN setting, turn the WLAN transceiver on or off based on at least one operator setting from an operator of the cellular network.

24. The product of claim 22, wherein the plurality of WLAN setting options comprise at least one WLAN-on setting, at least one WLAN-off setting, and at least one WLAN-no-user-preference setting.

* * * * *

UNITED STATES PATENT AND TRADEMARK OFFICE
CERTIFICATE OF CORRECTION

PATENT NO. : 10,306,550 B2
APPLICATION NO. : 15/506013
DATED : May 28, 2019
INVENTOR(S) : Alexander Sirotkin et al.

It is certified that error appears in the above-identified patent and that said Letters Patent is hereby corrected as shown below:

In the Claims

In Column 38, Line 21, in Claim 20, delete "instructions when executed, cause" and insert --instructions, when executed, cause--, therefor.

In Column 38, Line 51, in Claim 23, delete "instructions, when, executed, cause" and insert --instructions, when executed, cause--, therefor.

Signed and Sealed this
Thirteenth Day of August, 2019

Andrei Iancu
*Director of the United States Patent and Trademark Office*